(12) United States Patent
Ishii et al.

(10) Patent No.: US 12,524,772 B2
(45) Date of Patent: *Jan. 13, 2026

(54) INFORMATION MANAGEMENT SYSTEM AND INFORMATION MANAGEMENT METHOD

(71) Applicant: TOYOTA JIDOSHA KABUSHIKI KAISHA, Toyota (JP)

(72) Inventors: Masahiko Ishii, Okazaki (JP); Hidetaka Asano, Nissin (JP); Keiichi Koga, Narashino (JP); Ryota Suzuki, Ikeda (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 272 days.

This patent is subject to a terminal disclaimer.

(21) Appl. No.: 18/366,059

(22) Filed: Aug. 7, 2023

(65) Prior Publication Data

US 2024/0062224 A1  Feb. 22, 2024

(30) Foreign Application Priority Data

Aug. 22, 2022 (JP) .................. 2022-131792

(51) Int. Cl.
G06Q 30/018 (2023.01)
(52) U.S. Cl.
CPC .................. *G06Q 30/018* (2013.01)
(58) Field of Classification Search
CPC .................................. G06Q 30/018
See application file for complete search history.

(56) References Cited

U.S. PATENT DOCUMENTS

| | | | |
|---|---|---|---|
| 2016/0063375 A1* | 3/2016 | Gilgert | G06Q 30/018 706/46 |
| 2020/0052883 A1* | 2/2020 | Dender | H04L 63/126 |
| 2023/0065582 A1* | 3/2023 | Hoggle | G06Q 10/08 |
| 2025/0061416 A1* | 2/2025 | Schwabe | H01M 10/4221 |

FOREIGN PATENT DOCUMENTS

| | | | | |
|---|---|---|---|---|
| JP | 2009-070257 A | | 4/2009 | |
| JP | 2011145720 A | * | 7/2011 | |
| JP | 2013152574 A | * | 8/2013 | |
| KR | 20160023500 A | * | 3/2016 | G06Q 50/26 |

OTHER PUBLICATIONS

S. S. Takhar and K. Liyanage, "Framework for a chemical substance reporting system," 2018 7th International Conference on Industrial Technology and Management (ICITM), Oxford, UK, 2018, pp. 367-374. (Year: 2018).*

Jun. 10, 2025 Notice of Allowance issued in U.S. Appl. No. 18/356,402.

* cited by examiner

*Primary Examiner* — Jeff Zimmerman
*Assistant Examiner* — Hunter Molnar
(74) *Attorney, Agent, or Firm* — Oliff PLC

(57) ABSTRACT

A node of a B company updates a restriction list (S1) based on transaction data received from a platform provider, the transaction data proposing addition of a new restricted substance to the restriction list. The node of the B company starts checking processing and estimates whether or not there is possibility that the new restricted substance is contained in a C product supplied by a C company and a D product supplied by a D company (S2). The node of the B company generates transaction data that asks whether or not the new restricted substance is contained in the C product and transmits the transaction data to a node of the C company (S3).

8 Claims, 18 Drawing Sheets

FIG.6

| PRODUCT NAME | C PRODUCT | | | |
|---|---|---|---|---|
| PRODUCT NUMBER | C001 | | | |
| CONSTITUENT PRODUCT NUMBER | CA001 | CA002 | CA003 | CA004 |
| CONTENT RATIO | X1% | X2% | X3% | X4% |
| NECESSITY FOR KEEPING SECRET | PUBLIC | PUBLIC | NON-PUBLIC | NON-PUBLIC |

↓
PUBLIC

FIG.7

| PRODUCT NAME | B PRODUCT | | | | |
|---|---|---|---|---|---|
| PRODUCT NUMBER | B001 | | | | |
| CONSTITUENT PRODUCT NUMBER | C PRODUCT：C001 | | | D PRODUCT：D001 | | |
| | | CA001 | CA002 | DA001 | DA002 | DA003 |
| CONTENT RATIO | Z1% | X1% | X2% | Z2% | Y1% | Y2% | Y3% |
| NECESSITY FOR KEEPING SECRET | PUBLIC | | | NON-PUBLIC | | |

FIG.10

| PRODUCT NAME | B PRODUCT | | | | | | |
|---|---|---|---|---|---|---|---|
| PRODUCT NUMBER | B001 | | | | | | |
| CONSTITUENT PRODUCT NUMBER | | C PRODUCT:C001 | | | | D PRODUCT:D001 | |
| | | CA001 | CA002 | CA003 | | DA001 | DA002 | DA003 |
| CONTENT RATIO | Z1% | X1% | X2% | X3% | Z2% | Y1% | Y2% | Y3% |
| NECESSITY FOR KEEPING SECRET | | PUBLIC | | | | NON-PUBLIC | | |

FIG.17

| PRODUCT NAME | B PRODUCT | | | | | | |
|---|---|---|---|---|---|---|---|
| PRODUCT NUMBER | B001 | | | | | | |
| CONSTITUENT PRODUCT NUMBER | | C PRODUCT : C001 | | | | D PRODUCT : D001 | |
| | | CA001 | CA002 | HA001 | HA002 | DA001 | DA002 | DA003 |
| CONTENT RATIO | Z1% | X1% | X2% | HAxx1 | HAxx2 | Z2% | Y1% | Y2% | Y3% |
| NECESSITY FOR KEEPING SECRET | | PUBLIC | | | | | NON-PUBLIC | |

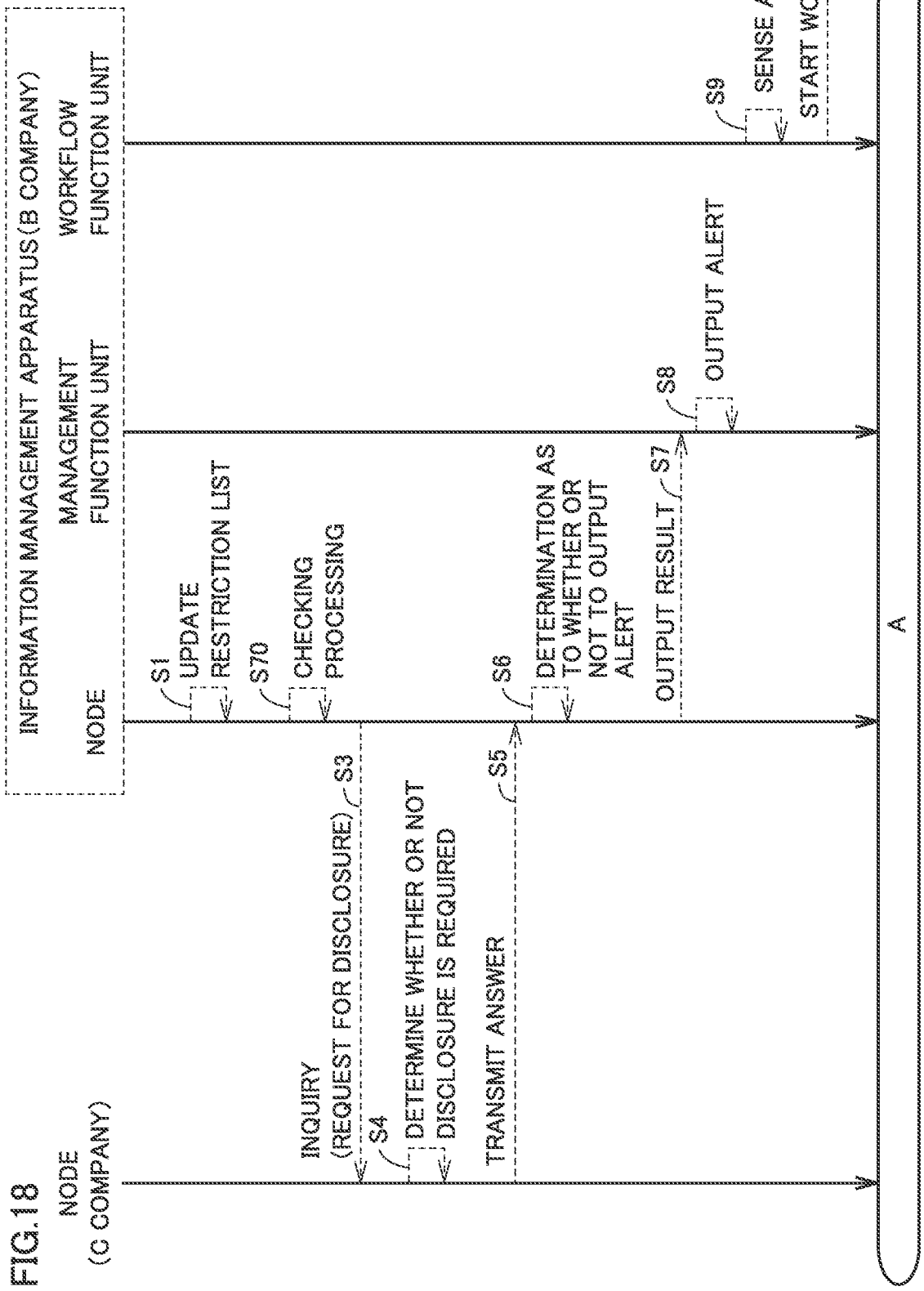

INFORMATION MANAGEMENT SYSTEM AND INFORMATION MANAGEMENT METHOD

CROSS REFERENCE TO RELATED APPLICATIONS

This nonprovisional application is based on Japanese Patent Application No. 2022-131792 filed with the Japan Patent Office on Aug. 22, 2022, the entire contents of which are hereby incorporated by reference.

BACKGROUND

Field

The present disclosure relates to an information management system that manages information based on distributed ledger technology and an information management method of managing information based on distributed ledger technology.

Description of the Background Art

Japanese Patent Laying-Open No. 2009-70257 discloses an information management system that manages information on a chemical substance contained in a component traded in a supply chain including an end product manufacturer and a supplier that supplies a component to the end product manufacturer. This information management system is connected to a supplier terminal used by the supplier and another supplier terminal used by another supplier over a network. Another supplier supplies the supplier with a sub component included in a component delivered by the supplier to the end product manufacturer. The supplier requests another supplier to disclose information on a chemical substance contained in the sub component for reporting information on the chemical substance contained in the component to the end product manufacturer.

SUMMARY

In a supply chain, information on a chemical substance contained in a distributed product, in particular, a chemical substance to be restricted by laws and regulations etc., may be disclosed from an upstream company to a downstream company. For a company, however, information on a chemical substance contained in its product is important, and there is a demand for avoidance of disclosure as much as possible. Therefore, the upstream company discloses, as composition data of the distributed product, information on the chemical substance to be restricted under the laws and regulations etc. to a downstream company, whereas the upstream company may keep information on a chemical substance which is not under the restriction secret from the downstream company.

Therefore, when a new chemical substance is added to substances to be restricted as a result of revision of the laws and regulations etc., for example, the downstream company performs processing for checking whether or not composition data of the distributed product disclosed by the upstream company includes the new chemical substance, or when the composition data of the distributed product does not include the new chemical substance, the downstream company performs processing for asking the upstream company whether or not the distributed product contains the new chemical substance. The processing normally includes works humanly performed by a person in charge of the processing or the like and hence much cost and many man-hours are required. Construction of a scheme that reduces the number of man-hours for works in a supply chain has been desired.

The present disclosure was made to solve the problem above, and an object of the present disclosure is to provide a scheme that reduces the number of man-hours for works in a supply chain.

(1) An information management system according to one aspect of the present disclosure is an information management system that manages information on a chemical substance contained in a product distributed in a supply chain based on distributed ledger technology. The information management system includes a first apparatus that belongs to a first company that manufactures a first product, the first apparatus including a first distributed ledger, a second apparatus that belongs to a second company that supplies a second product to be included in the first product to the first company, the second apparatus including a second distributed ledger, and a management apparatus that manages the information management system, the management apparatus including a third distributed ledger. Each of the first distributed ledger, the second distributed ledger, and the third distributed ledger includes a list showing the chemical substance managed in the information management system. Composition data of the first product including public data which is composition data of the second product disclosed by the second apparatus is stored in the first apparatus. The second apparatus incorporates information on a chemical substance included in both of the composition data of the second product and the list in the second distributed ledger into the public data. The management apparatus adds, when the management apparatus designates a new chemical substance to be managed in the information management system, the new chemical substance to the list in the third distributed ledger to update the list in the third distributed ledger, and transmits first transaction data that proposes addition of the new chemical substance to update the list in the first distributed ledger and the list in the second distributed ledger to the first apparatus and the second apparatus. The first apparatus and the second apparatus update the list in the first distributed ledger and the list in the second distributed ledger based on the first transaction data from the management apparatus, respectively. When the first apparatus estimates that there is possibility that the new chemical substance is contained in the second product, the first apparatus transmits second transaction data including a request for disclosure of the new chemical substance to the second apparatus.

According to the configuration, when the first apparatus estimates that there is possibility that the second product contains the new chemical substance, it transmits the second transaction data including the request for disclosure of the new chemical substance to the second apparatus. This can automate processing performed from addition of the new chemical substance to the list until transmission of the second transaction data including the request for disclosure of the new chemical substance to the second apparatus, which can hence reduce human works by a person in charge in each type of processing for an inquiry or checking. By way of example, when the first apparatus estimates that there is possibility that the second product contains the new chemical substance, it may output an alert indicating that measures in connection with the new chemical substance need to be taken for the first product. In response to output of the alert, the first apparatus may have processing associated with the request for disclosure at least partially humanly performed. When the first apparatus estimates that there is no possibility that the second product contains the new chemical substance, it may skip processing associated with the output of the alert and the request for disclosure. Human works can thus be reduced.

(2) In one embodiment, in response to the request for disclosure, the second apparatus transmits to the first apparatus, when the new chemical substance is not contained in the second product, third transaction data including information indicating that fact, and transmits to the first apparatus, when the new chemical substance is contained in the second product, fourth transaction data including information indicating subsequent disclosure of fifth transaction data including the public data including information on the new chemical substance.

For disclosure of a new chemical substance, normally, a certain time period for approval processing or the like in a company is required. Therefore, when the second product contains the new chemical substance, it takes relatively long time for the first company to obtain an answer to the request for disclosure. According to the configuration, even when the second product contains the new chemical substance, information indicating subsequent disclosure is initially transmitted. Therefore, the first company can recognize early whether or not the second product contains the new chemical substance.

(3) In one embodiment, the second apparatus is configured to communicate with a plurality of terminal apparatuses belonging to respective ones of a plurality of departments associated with the second company. The second apparatus obtains approval for disclosure of the information on the new chemical substance from a terminal apparatus belonging to a department having an authority to disclose the information on the new chemical substance, of the plurality of terminal apparatuses, and transmits the fifth transaction data including the public data including the information on the new chemical substance to the first apparatus.

Information on a chemical substance contained in a company's product is very important for the company. According to the configuration, approval for disclosure of information on the new chemical substance is obtained from an appropriate department, and after approval is obtained, the information on the new chemical substance is disclosed. Therefore, the information on the new chemical substance can appropriately be disclosed.

(4) In one embodiment, when the public data does not include the information on the new chemical substance, the first apparatus estimates that there is the possibility that the new chemical substance is contained in the second product.

According to the configuration, when the public data does not include the information on the new chemical substance, it can be estimated that there is possibility that the second product contains the new chemical substance, and the second transaction data including the request for disclosure of the new chemical substance can be transmitted to the second apparatus.

(5) In one embodiment, when there is composition data of the second product not included in the public data, the second apparatus transmits to the first apparatus, sixth transaction data including the public data and information indicating presence of non-public information. When the first apparatus has received the sixth transaction data including data indicating presence of the non-public information from the second apparatus, the first apparatus estimates that there is the possibility that the new chemical substance is contained in the second product.

According to the configuration, when there is composition data of the second product not included in the public data, information indicating presence of non-public information is transmitted from the second apparatus to the first apparatus. The first apparatus can accurately estimate that there is the possibility that the second product contains the new chemical substance based on whether or not it has received the information indicating presence of the non-public information.

(6) In one embodiment, the public data includes information on content ratios for components of the second product. When a total of the content ratios included in the public data is less than 100%, the first apparatus estimates that there is the possibility that the new chemical substance is contained in the second product According to the configuration, the first apparatus can accurately estimate that there is possibility that the second product contains the new chemical substance based on the total of the content ratios included in the public data.

(7) In one embodiment, when the second product contains the new chemical substance added to the list in the second distributed ledger and when the information on the new chemical substance is not included in the public data, the second apparatus transmits to the first apparatus, seventh transaction data including information indicating presence of information to be disclosed. When the first apparatus has received from the second apparatus, the information indicating presence of the information to be disclosed, the first apparatus estimates that there is the possibility that the new chemical substance is contained in the second product.

According to the configuration, when the second product contains the new chemical substance added to the list and the new chemical substance is not included in the public data, information indicating presence of information to be disclosed is transmitted from the second apparatus to the first apparatus. The first apparatus can accurately estimate that there is the possibility that the second product contains the new chemical substance based on whether or not it has received the information indicating presence of the information to be disclosed.

(8) An information management method according to another aspect of the present disclosure is an information management method for an information management system that manages information on a chemical substance contained in a product distributed in a supply chain based on distributed ledger technology. The information management system includes a first apparatus that belongs to a first company that manufactures a first product, the first apparatus including a first distributed ledger, a second apparatus that belongs to a second company that supplies a second product to be included in the first product to the first company, the second apparatus including a second distributed ledger, and a management apparatus that manages the information management system, the management apparatus including a third distributed ledger. Each of the first distributed ledger, the second distributed ledger, and the third distributed ledger includes a list showing the chemical substance managed in the information management system. Composition data of the first product including public data which is composition data of the second product disclosed by the second apparatus is stored in the first apparatus. The second apparatus incorporates information on a chemical substance included in both of the composition data of the second product and the list in the second distributed ledger into the public data. The information management method includes adding, by the management apparatus, when the management apparatus designates a new chemical substance to be managed in the information management system, the new chemical substance to the list in the third distributed ledger to update the list in the third distributed ledger, transmitting, by the management apparatus, first transaction data that proposes addition of the new chemical substance to update the list in the first distributed ledger and the list in the second distributed ledger to the first apparatus and the second apparatus, updating, by the first apparatus and the second apparatus, the list in the first distributed ledger and the list in the second distributed ledger based on the first transaction data from the management apparatus, respectively, and transmitting, by the first apparatus, when the first apparatus estimates that there is possibility that the new chemical substance is contained in the second product, second transaction data including a request for disclosure of the new chemical substance to the second apparatus.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 6 is a diagram schematically showing exemplary product composition data on a C product of a C company.

FIG. 7 is a diagram schematically showing exemplary product composition data on a B product.

FIG. 10 is a diagram schematically showing exemplary updated product composition data on the B product.

FIG. 17 is a diagram schematically showing exemplary product composition data on the B product according to a fourth modification.

FIG. 18 is a sequence diagram for illustrating checking processing according to the fourth modification.

DESCRIPTION OF THE PREFERRED EMBODIMENTS

Figure 1:
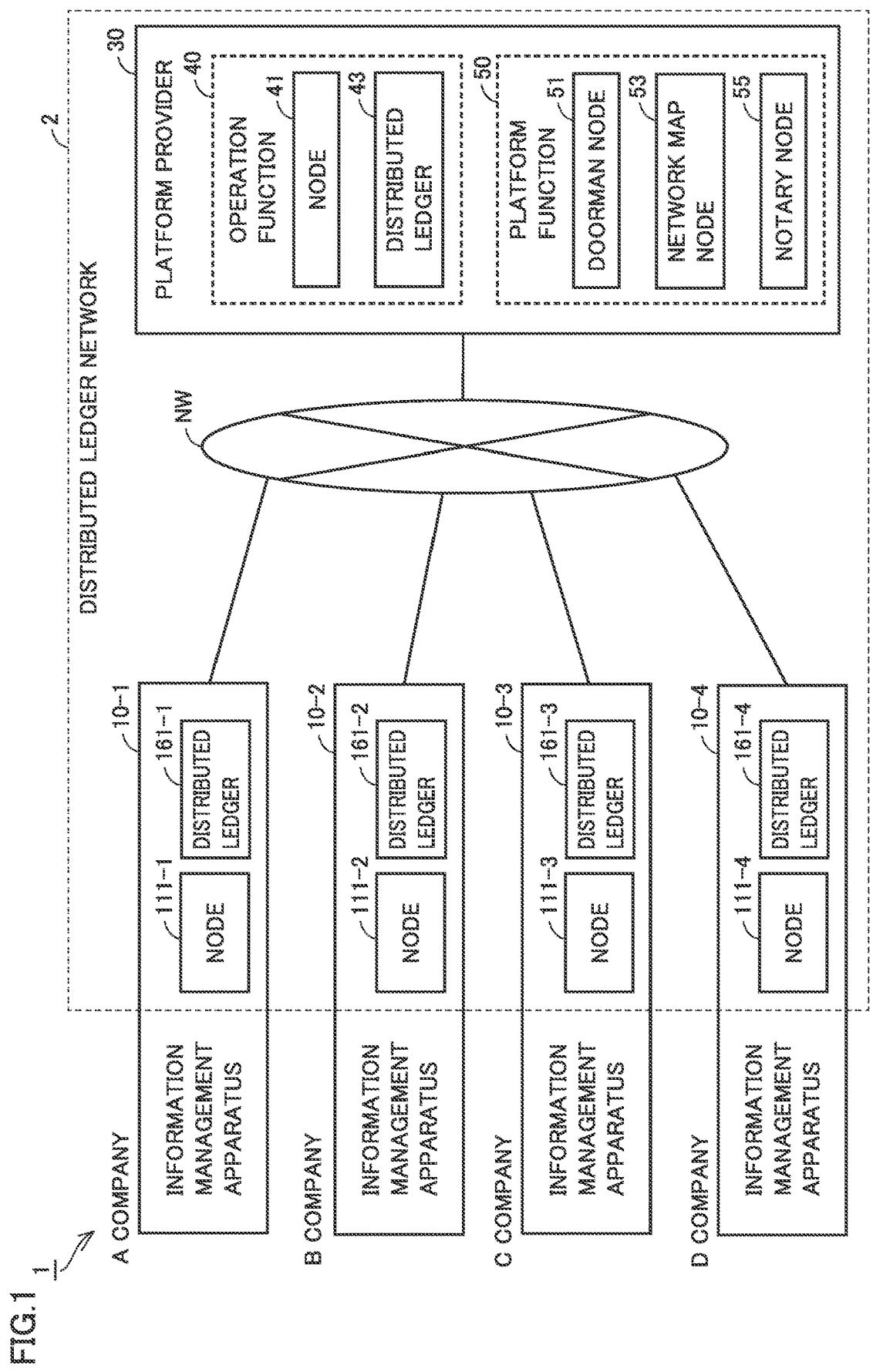
FIG. 1 is a diagram showing a schematic configuration of an information management system according to an embodiment.

An embodiment of the present disclosure will be described in detail below with reference to the drawings. The same or corresponding elements in the drawings have the same reference characters allotted and description thereof will not be repeated.

<Overall Configuration of Information Management System>

FIG. 1 is a diagram showing a schematic configuration of an information management system 1 according to the present embodiment. Information management system 1 according to the present embodiment is a system for managing, based on distributed ledger technology, information on a specific chemical substance (which is also referred to as a "subject substance" below) contained in a product (including a component and a raw material) distributed in a supply chain including a plurality of companies. In the present embodiment, a supply chain including four companies (an A company, a B company, a C company, and a D company) is assumed by way of example. In information management system 1, the subject substance is a chemical substance to be reported to a downstream company in the supply chain. The subject substance includes, for example, a chemical substance designated as a substance of very high concern (SVHC) as a highly harmful substance under the Registration, Evaluation, Authorization, and Restriction of Chemicals (REACH) regulation and/or a chemical substance designated in the global automotive declarable substance list (GADSL) which is a chemical substance list managed worldwide. The chemical substance designated as the SVHC and/or the chemical substance designated in the GADSL are/is also referred to as a "restricted substance(s)" below. The restricted substance may include a chemical substance designated under other laws and regulations. Furthermore, a company that participates in information management system 1 can also have an optional chemical substance included as the subject substance. In other words, the subject substance managed by information management system 1 may include the restricted substance and the chemical substance optionally designated by a participating company. Each company is obliged to convey (report) information on the restricted substance to a downstream company. On the other hand, each company is not obliged to convey to a downstream company, information on the chemical substance optionally designated by the participating company. Information management system 1 manages the restricted substance based on a restriction list which will be described later. In other words, when a downstream company issues a disclosure request to request an upstream company to disclose the subject substance and when the subject substance, disclosure of which has been requested, falls under a chemical substance other than the restricted substance (that is, a chemical substance not registered in the restriction list), the upstream company can reject the disclosure request.

Information management system 1 includes an information management apparatus 10-1 belonging to the A company, an information management apparatus 10-2 belonging to the B company, an information management apparatus 10-3 belonging to the C company, an information management apparatus 10-4 belonging to the D company, and a platform provider 30. In the present embodiment, the A company is an end product manufacturer and falls under what is called a "downstream company" in the supply chain. In the present embodiment, the B company is a component manufacturer and falls under what is called a "midstream company" in the supply chain. In the present embodiment, the C company and the D company are material manufacturers and fall under what is called "upstream companies" in the supply chain.

Figure 2:
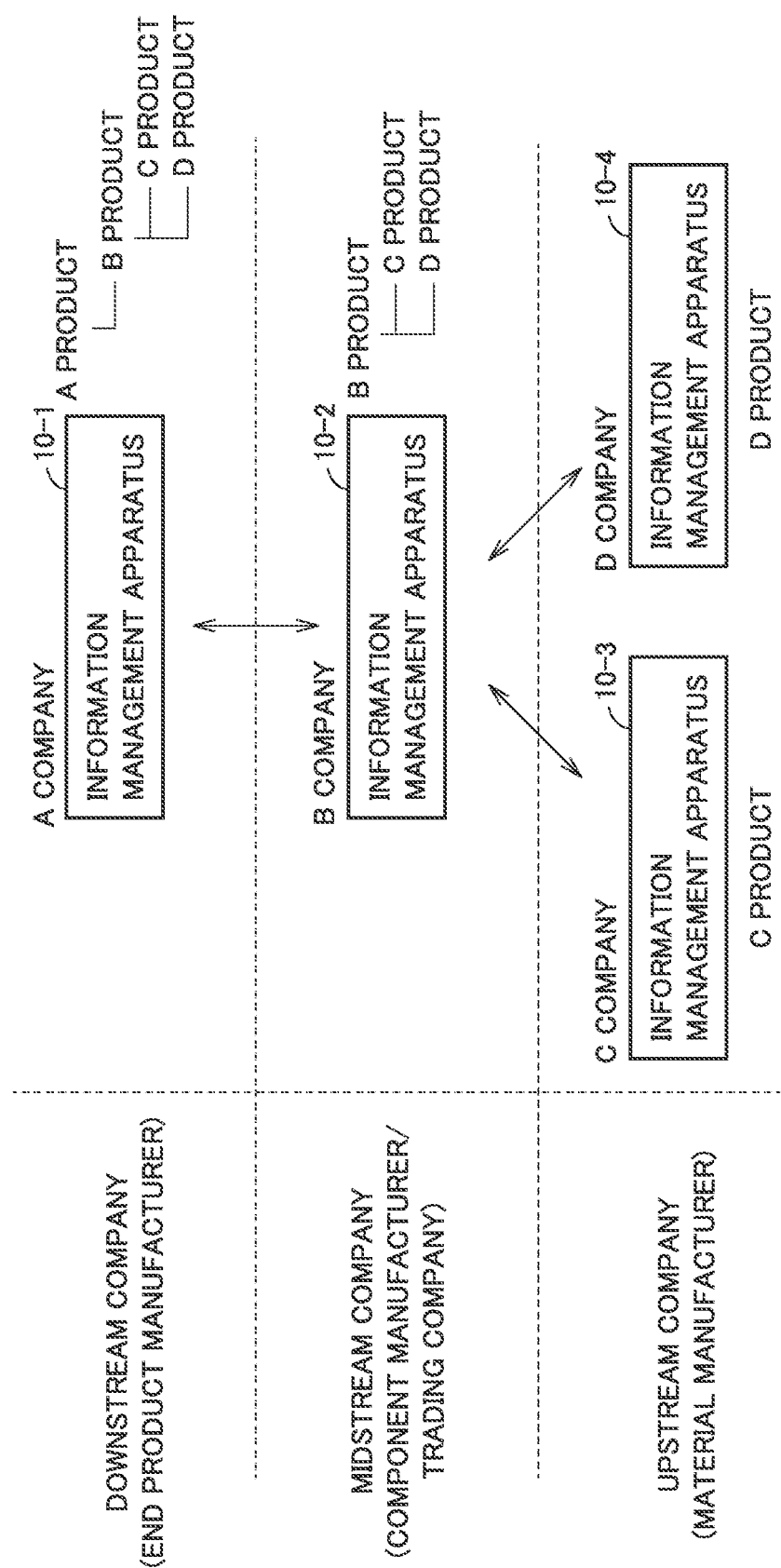
FIG. 2 is a diagram for illustrating business relation among companies in a supply chain.

FIG. 2 is a diagram for illustrating business relation among companies in the supply chain. The C company supplies a C product which is its product to the B company. The D company supplies a D product which is its product to the B company. The B company manufactures a B product which is its product from the C product purchased (supplied) from the C company and the D product purchased from the D company, and supplies the B product to the A company. The A company manufactures an A product which is its product from the product purchased from the B company and sells the A product to an end user. The A company may be, for example, an automaker.

The midstream company may include a trading company. A trading company may be interposed, for example, between the A company and the B company, between the B company and the C company, and/or between the B company and the D company.

Each company is required to manage information on a chemical substance contained in a product sold by that company. Each company in the supply chain obtains disclosure from an upstream company thereof, of information on a subject substance contained in a product that it purchases therefrom, and manages the information on the chemical substance contained in a product it sells. For example, the A company receives from the B company, information on the subject substance contained in the B product, and based on that information, the A company manages the information on the chemical substance contained in the A product.

In information management system 1 according to the present embodiment, information is conveyed only between companies in direct business relation with each other. For example, a downstream company (the A company) and a midstream company (the B company) in supply-demand relation of products with each other are in direct business relation with each other. A midstream company (the B company) and an upstream company (the C company, the D company) in supply-demand relation of products with each other are in direct business relation with each other. On the other hand, a downstream company (the A company) and an upstream company (the C company, the D company) are not in direct business relation. In other words, information is conveyed between the downstream company (the A company) and the midstream company (the B company) and between the midstream company (the B company) and the upstream company (the C company, the D company), whereas information is not conveyed between the downstream company (the A company) and the upstream company (the C company, the D company). For example, when an E company which is a trading company is interposed between the A company and the B company, information is conveyed between the A company and the E company and between the E company and the B company, whereas information is not conveyed between the A company and the B company.

For example, when trade of the C product is started between the B company and the C company, information at least on restricted substances of subject substances contained in the C product is provided from the C company to the B company. Specifically, the C company voluntarily provides information on restricted substances among subject substances contained in the C product to the B company, or the C company provides that information to the B company in response to a request from the B company. On the other hand, information on a chemical substance other than the restricted substance among the subject substances contained in the C product is provided from the C company to the B company voluntarily or in response to a request from the B company. In other words, the C company may not provide to the B company, information on the chemical substance other than the restricted substance among the subject substances contained in the C product. This is also applicable to information provided between the A company and the B company and between the B company and the D company. When trade of the D product is started between the B company and the D company, the D company provides information at least on a restricted substance among subject substances contained in the D product to the B company. When trade of the B product is started between the A company and the B company, the B company provides information at least on the restricted substance among the subject substances contained in the B product to the A company. As each company thus receives information at least on the restricted substance among the subject substances contained in a product it purchased from an upstream company in direct business relation, each company manages information on the chemical substance contained in its product including the purchased product. Information is conveyed between companies over a distributed ledger network 2 (FIG. 1) including information management apparatuses 10-1 to 10-4 and platform provider 30.

Referring again to FIG. 1, distributed ledger platform software has been introduced in each of information management apparatuses 10-1 to 10-4. The distributed ledger platform includes smart contract that allows limitation of a range where transaction data is shared to a range between concerned parties. Therefore, distributed ledgers 161-1 to 161-4 of information management apparatuses 10-1 to 10-4 hold transaction data that are different from one another. For example, CORDA® may be adopted as the distributed ledger platform. Distributed ledgers 161-1 to 161-4 may be denoted as a "distributed ledger 161-N" when they are not particularly distinguished from one another.

As the introduced distributed ledger platform software functions, controllers 110-1 to 110-4 (FIG. 5 which will be described later) included in information management apparatuses 10-1 to 10-4 function as nodes 111-1 to 111-4, respectively. Communication among nodes 111-1 to 111-4 over a network NW allows formation of distributed ledger network 2. Information management apparatuses 10-1 to 10-4 are basically similar in configuration to one another. Therefore, when information management apparatuses 10-1 to 10-4 are not particularly distinguished from one another, they may be denoted as an "information management apparatus 10-N." Nodes 111-1 to 111-4 may be denoted as a "node 111-N" when they are not particularly distinguished from one another.

Figure 3:
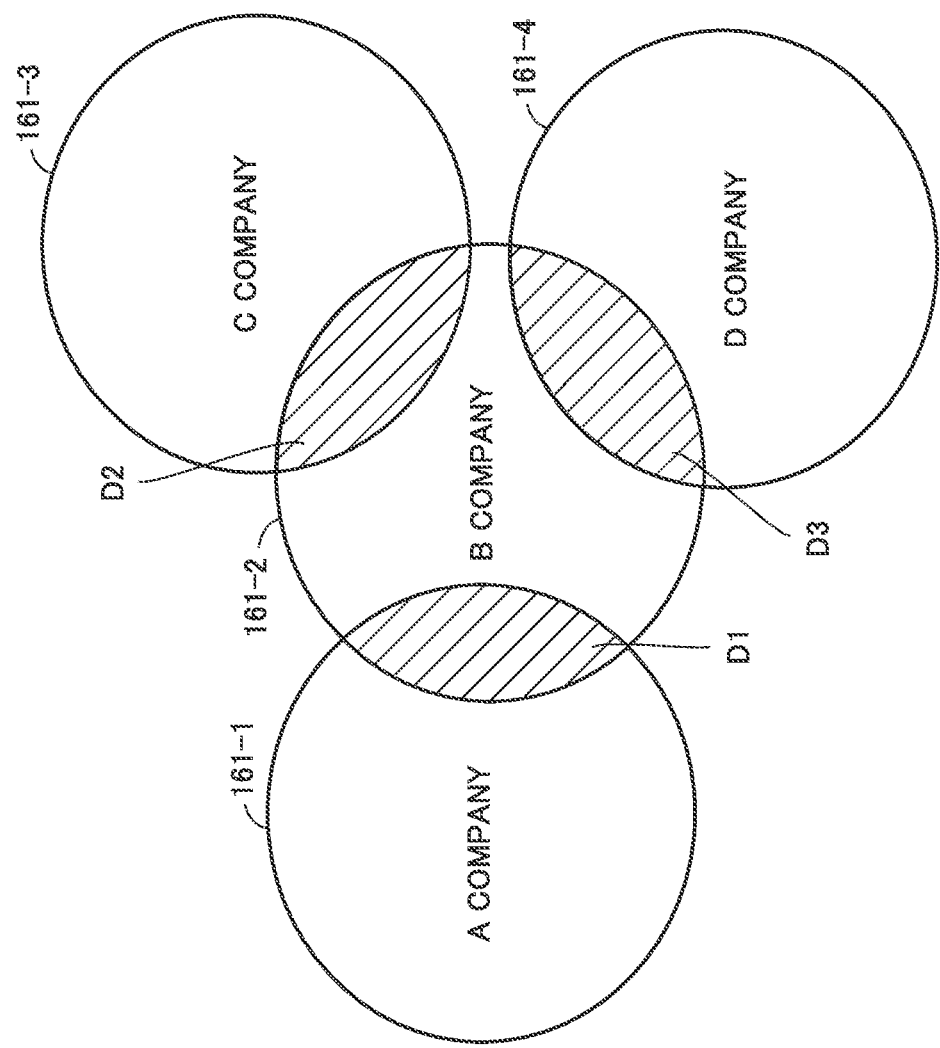
FIG. 3 is a conceptual diagram for illustrating a distributed ledger.

FIG. 3 is a conceptual diagram for illustrating distributed ledger 161-N. FIG. 3 schematically shows relation among distributed ledgers 161-1 to 161-4 stored in respective information management apparatuses 10-1 to 10-4.

Distributed ledger 161-1 and distributed ledger 161-2 share transaction data transmitted and received between information management apparatus 10-1 (node 111-1) of the A company and information management apparatus 10-2 (node 111-2) of the B company (a region D1). Region D1 includes, for example, transaction data including information on the subject substance contained in the B product, that is transmitted and received between nodes 111-1 and 111-2. Region D1 also includes, for example, transaction data for an inquiry about the subject substance contained in the B product and transaction data on an answer to the inquiry that are transmitted and received between nodes 111-1 and 111-2.

Distributed ledger 161-2 and distributed ledger 161-3 share transaction data transmitted and received between information management apparatus 10-2 (node 111-2) of the B company and information management apparatus 10-3 (node 111-3) of the C company (a region D2). Region D2 includes, for example, transaction data including information on the subject substance contained in the C product, that is transmitted and received between nodes 111-2 and 111-3. Region D2 also includes, for example, transaction data for an inquiry about the subject substance contained in the C product and transaction data on an answer to the inquiry that are transmitted and received between nodes 111-2 and 111-3.

Distributed ledger 161-2 and distributed ledger 161-4 share transaction data transmitted and received between information management apparatus 10-2 (node 111-2) of the B company and information management apparatus 10-4 (node 111-4) of the D company (a region D3). Region D3 includes, for example, transaction data including information on the subject substance contained in the D product, that is transmitted and received between nodes 111-2 and 111-4. Region D3 also includes, for example, transaction data for an inquiry about the subject substance contained in the D product and transaction data on an answer to the inquiry that are transmitted and received between nodes 111-2 and 111-4.

For example, the B company, which is the midstream company in the supply chain, may not want the A company to know information about from which company it purchases the C product and the D product included in the B product. Transaction data includes information on a sender node and a destination node. Therefore, for example, if transaction data is broadcast to all nodes that form distributed ledger network 2, the A company may know a source of the C product and the D product. In information management system 1 according to the present embodiment, as the range within which transaction data is shared is limited to the range between concerned parties, disclosure of information (a company name or the like) on a business partner to a company other than a company in direct business relation can be suppressed.

Referring again to FIG. 1, distributed ledger network 2 in information management system 1 is a consortium/private network. Platform provider 30 functions as a manager of information management system 1. Platform provider 30 performs, as its function, an operation function 40 and a platform function 50. Operation function 40 includes a node 41, a list manager 42 (FIG. 4), and a distributed ledger 43, and performs a node function to register and update a restriction list which will be described later in distributed ledger network 2. Details of operation function 40 will be described later. Platform provider 30 corresponds to an exemplary "management apparatus" according to the present disclosure.

Platform function 50 includes a doorman node 51, a network map node 53, and a notary node 55 and functions as a platformer that manages distributed ledger network 2.

Doorman node 51 approves an application for participation from node 111-N and node 41 that desire participation into distributed ledger network 2. Doorman node 51 issues a certificate to node 111-N and node 41. Node 111-N and node 41 that participate in distributed ledger network 2 each create a pair of a secret key and a public key at the time of participation (for example, at the time of initial start-up) and transmits a request for grant of the certificate to doorman node 51. Doorman node 51 verifies a predetermined condition and issues the certificate to node 111-N and node 41 that issued the request for grant of the certificate.

Information (for example, an IP address) of node 111-N and node 41, to which the certificate was issued by doorman node 51 (that is, participation of which into distributed ledger network 2 was permitted), is stored in network map node 53. Network map node 53 functions as a domain name system (DNS) in distributed ledger network 2. Nodes 111-1 to 111-4 and node 41 that form distributed ledger network 2 recognize a destination of transaction data, for example, based on information provided from network map node 53.

Notary node 55 gives finality to transaction data. When node 111-N and node 41 generate transaction data, they send transaction data including a hash value (a transaction ID) of the transaction data and an index of output of the transaction data to notary node 55. This transaction data includes a signature of a transaction data sender node (for example, node 111-2 of the B company) and a signature of a transaction data destination node (for example, node 111-1 of the A company). Notary node 55 verifies the transaction data based on the transaction ID and the index of output, and thereafter puts the signature to the transaction data and sends back the transaction data. Notary node 55 guarantees the order of the transaction data by sequentially holding the signed transaction data. For example, notary node 55 may hold a map, the map including the transaction ID and the index of output as keys and including the transaction ID, an index of input, and peer (node) information as values. For example, notary node 55 may be configured to add the transaction data to the map and puts the signature to the transaction data when there is no matching key in the map. Notary node 55 may be configured to send back an error when there is a matching key in the map.

Node 111-N and node 41 generate transaction data. As the distributed ledger platform software functions as described above, controller 110-N (FIG. 5) included in information management apparatus 10-N functions as node 111-N. As distributed ledger platform software functions, a controller 31 (FIG. 4) included in platform provider 30 functions as node 41.

In information management system 1, platform provider 30 (operation function 40) monitors revision of the laws and regulations etc. (that is, update of the restricted substance(s)). Specifically, platform provider 30 monitors, for example, update of the SVHC and/or update of the GADSL. When platform provider 30 senses such update, that is, when a new chemical substance is designated as an SVHC and/or when a new chemical substance is designated in the GADSL, platform provider 30 senses addition of the restricted substance. When node 41 of platform provider 30 senses addition of the restricted substance, it transmits transaction data that proposes addition of the restricted substance (update of the restriction list) to all nodes 111-1 to 111-4.

Product composition data (151-N and 164-N in FIG. 5) on a company's product is stored in information management apparatus 10-N. The product composition data is information important for each company and there is a demand for avoidance of disclosure of the product composition data as much as possible. In the present embodiment, in each company, the product composition data is classified into product composition data to be published to a downstream company and product composition data not to be published thereto. For example, each company may publish information on a restricted substance to a downstream company, whereas it may keep information on a subject substance which is not under the restriction secret from the downstream company.

When a new chemical substance is added as the restricted substance as a result of revision of the laws and regulations etc. and when a company's product contains the new restricted substance, the company should disclose product composition data including information on the new restricted substance (updated product composition data) to a downstream company. For example, when the B company which is the midstream company supplies the B product to the A company which is the downstream company and when the B product contains the new restricted substance, the B company is obliged to disclose updated product composition data to the A company. Product composition data on the C product and the D product disclosed by the C company and the D company may include information on a secret chemical substance. Therefore, the B company is unable to appropriately determine whether or not the B product contains the new restricted substance. Each company initially checks whether or not product composition data disclosed by an upstream company includes information on the new restricted substance. When the product composition data disclosed by the upstream company does not include the information on the restricted substance, each company performs processing for asking the upstream company whether or not the restricted substance is contained or processing for requesting the upstream company to disclose information. Such processing normally includes human works by a person in charge of each type of processing. For example, the processing includes such human processing as preparation of a material for an inquiry about whether or not the restricted substance is contained, conversion of the material into a PDF format, or checking of a destination and a person in charge in transmission of an e-mail or a facsimile message, and requires much cost and a large number of man-hours.

Though details will be described later, in the present embodiment, being triggered by addition of a new chemical substance as a restricted substance as a result of revision of the laws and regulations etc., information management apparatus 10-N automatically determines (estimates) whether or not there is possibility that a product supplied by an upstream company contains a new restricted substance. When information management apparatus 10-N estimates that there is possibility that the product supplied by the upstream company contains the new restricted substance, it transmits to the information management apparatus of the upstream company, transaction data including a request for disclosure of the new restricted substance.

<Hardware Configuration>

Figure 4:
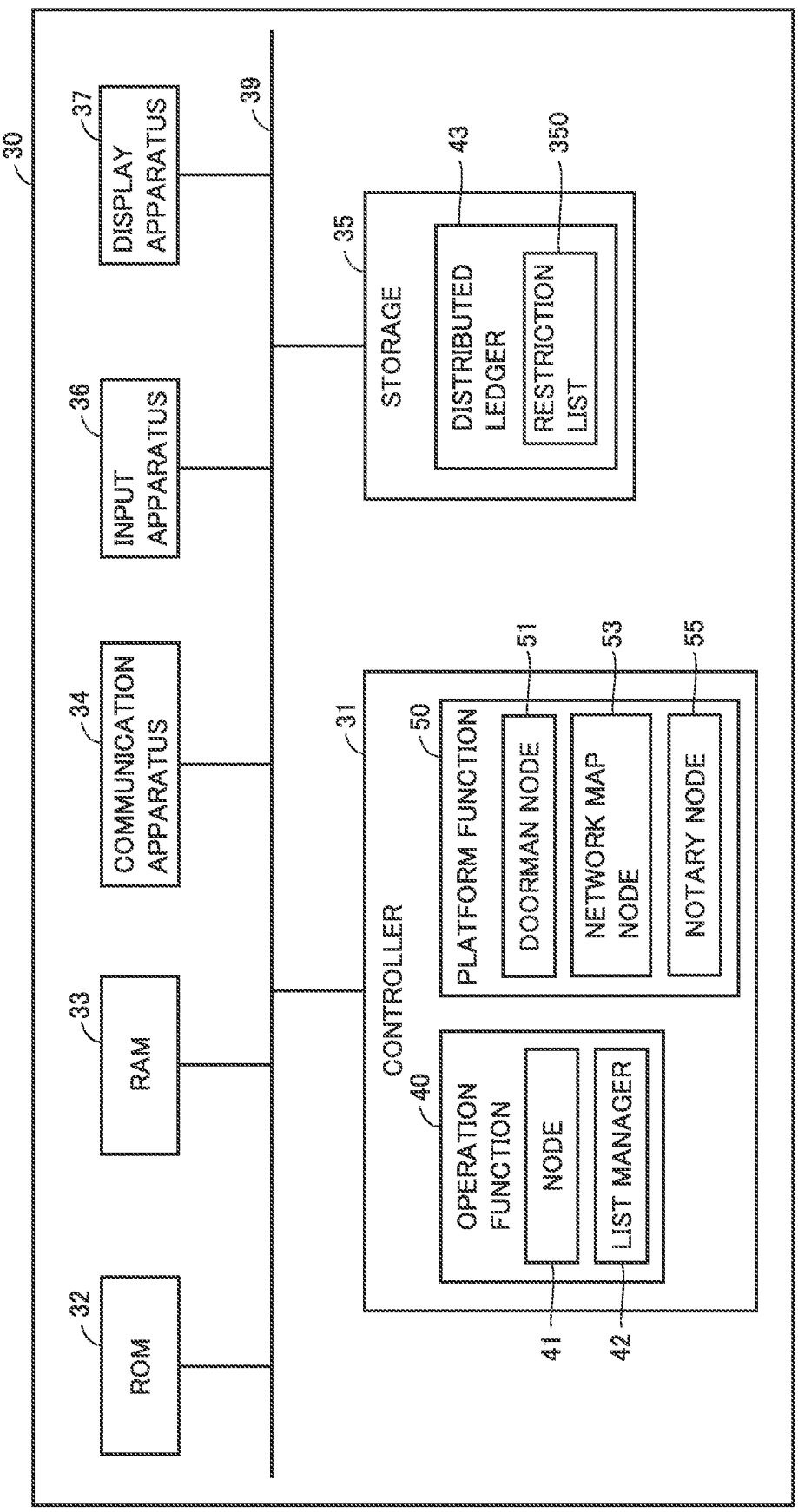
FIG. 4 is a diagram schematically showing a hardware configuration of a platform provider.

FIG. 4 is a diagram schematically showing a hardware configuration of platform provider 30. Platform provider 30 includes controller 31, a read only memory (ROM) 32, a random access memory (RAM) 33, a communication apparatus 34, a storage 35, an input apparatus 36, and a display apparatus 37. Controller 31, ROM 32, RAM 33, communication apparatus 34, storage 35, input apparatus 36, and display apparatus 37 are each connected to a bus 39.

Controller 31 is implemented, for example, by an integrated circuit including a central processing unit (CPU). Controller 31 develops various programs stored in ROM 32 on RAM 33 and executes the programs. The various programs include, for example, distributed ledger platform software. RAM 33 functions as a working memory, and various types of data necessary for execution of the various programs are temporarily stored in RAM 33. Controller 31 performs various types of processing by executing a program stored in ROM 32.

Communication apparatus 34 is configured to communicate with external equipment. The external equipment includes, for example, information management apparatus 10-N included in distributed ledger network 2. Communication apparatus 34 and the external equipment communicate with each other over the Internet. Examples of the external equipment include a server apparatus in an external group and the like that publishes a restricted substance on the Internet.

Input apparatus 36 includes an input device. The input device refers, for example, to a mouse, a keyboard, a touch panel, and/or another apparatus that can receive an operation by a user.

Display apparatus 37 includes a display. Display apparatus 37 shows on the display, various images in accordance with a control signal from controller 31. The display is, for example, a liquid crystal display, an organic electroluminescence (EL) display, or another display device.

Storage 35 includes a storage medium such as a hard disk or a flash memory. Distributed ledger 43 is stored in storage 35. Distributed ledger 43 and distributed ledger 161-N of information management apparatus 10-N are each, for example, a distributed ledger in a directed acyclic graph (DAG) structure. Transaction data included in distributed ledger 43 and distributed ledger 161-N forms a partially ordered data model. In the present embodiment, for example, one piece of transaction data forms one block.

Distributed ledger 43 includes a restriction list 350. Restriction list 350 is information indicating a restricted substance (for example, a chemical substance designated as the SVHC and/or a chemical substance designated in the GADSL). Restriction list 350 includes information on at least one restricted substance. Information on the restricted substance includes, for example, a Chemical Abstracts Service (CAS) number, a name of a substance, a date of update of restriction, and a report threshold value. The CAS number is an identification number specific to a chemical substance provided in a chemical substance registration system in CAS of the American Chemical Society. The name of the substance refers to a name of a chemical substance. The date of update of restriction refers to a date on which the chemical substance is added to restriction list 350 (date on which the chemical substance is subjected to reporting to a downstream company) or the date when restriction is imposed on the chemical substance under the laws and regulations etc. (for example, the date of designation as the SVHC). The report threshold value is a threshold value of a ratio (content ratio) of a chemical substance contained per unit amount of a product. When a content ratio is equal to or more than the report threshold value, information on the chemical substance of that product should be given to a downstream company. When the content ratio is less than the report threshold value, information on the chemical substance does not have to be given. "Addition of a new restricted substance to the restriction list" refers to addition of information on the restricted substance to the restriction list.

A secret key generated by node 41 of controller 31 may be stored in storage 35.

Controller 31 functions as node 41 and list manager 42 by executing a program relating to operation function 40.

At the time of initial start-up, node 41 generates a secret key and a public key in conformity with a prescribed standard. The public key is sent, for example, to network map node 53 of platform function 50. Node 41 performs a function to generate transaction data. Node 41 generates an electronic signature based on the secret key and puts the electronic signature to the transaction data. The secret key is stored, for example, in storage 35 or another storage which is not shown. Node 41 performs a function to approve transaction data proposed by another node. Node 41 verifies the transaction data proposed by another node, and when it sees no problem in a result of verification, it puts the electronic signature to the transaction data and sends the transaction data back to another node.

List manager 42 manages restriction list 350. List manager 42 communicates with the outside in prescribed cycles through communication apparatus 34 and monitors revision of the laws and regulations etc. (addition of the restricted substance). Specifically, list manager 42 communicates with a server apparatus of an external group in prescribed cycles through communication apparatus 34 to monitor whether or not a new restricted substance has been designated as the SVHC or whether or not a new chemical substance has been designated in the GADSL. When list manager 42 senses addition of the new chemical substance (addition of the restricted substance) to the SVHC, for example, as a result of revision of the laws and regulations etc., it requests node 41 to add the restricted substance to restriction list 350.

When node 41 receives a request for update of restriction list 350 from list manager 42, it generates transaction data to add the newly designated restricted substance to restriction list 350 and puts a signature to the transaction data. The newly designated restricted substance is thus added to restriction list 350 and restriction list 350 is updated. Specifically, node 41 transmits the transaction data to notary node 55, and by receiving the signed transaction data from notary node 55, node 41 commits the transaction data (finalizes the transaction). Node 41 transmits the signed transaction data to all nodes 111-1 to 111-4 that participate in distributed ledger network 2. In other words, node 41 transmits to all nodes 111-1 to 111-4 that participate in distributed ledger network 2, transaction data that proposes incorporation of the newly designated restricted substance in a restriction list 165-N (FIG. 5) of information management apparatus 10-N. As node 111-N that receives this transaction data approves the transaction data, the transaction data is added to distributed ledger 161-N of node 111-N so that restriction list 165-N of information management apparatus 10-N is updated. Specifically, node 41 transmits the transaction data sent back from node 111-N to notary node 55, and by receiving the signed transaction data from notary node 55, node 41 and node 111-N commit the transaction data. The transaction data signed by notary node 55 is transmitted, for example, from node 41 to node 111-N. Description of processing with which notary node 55 is involved in a process for processing transaction data is basically not provided below.

Controller 31 functions as doorman node 51, network map node 53, and notary node 55 by executing a program relating to platform function 50. Since these functions are as described above, description thereof will not be repeated.

Figure 5:
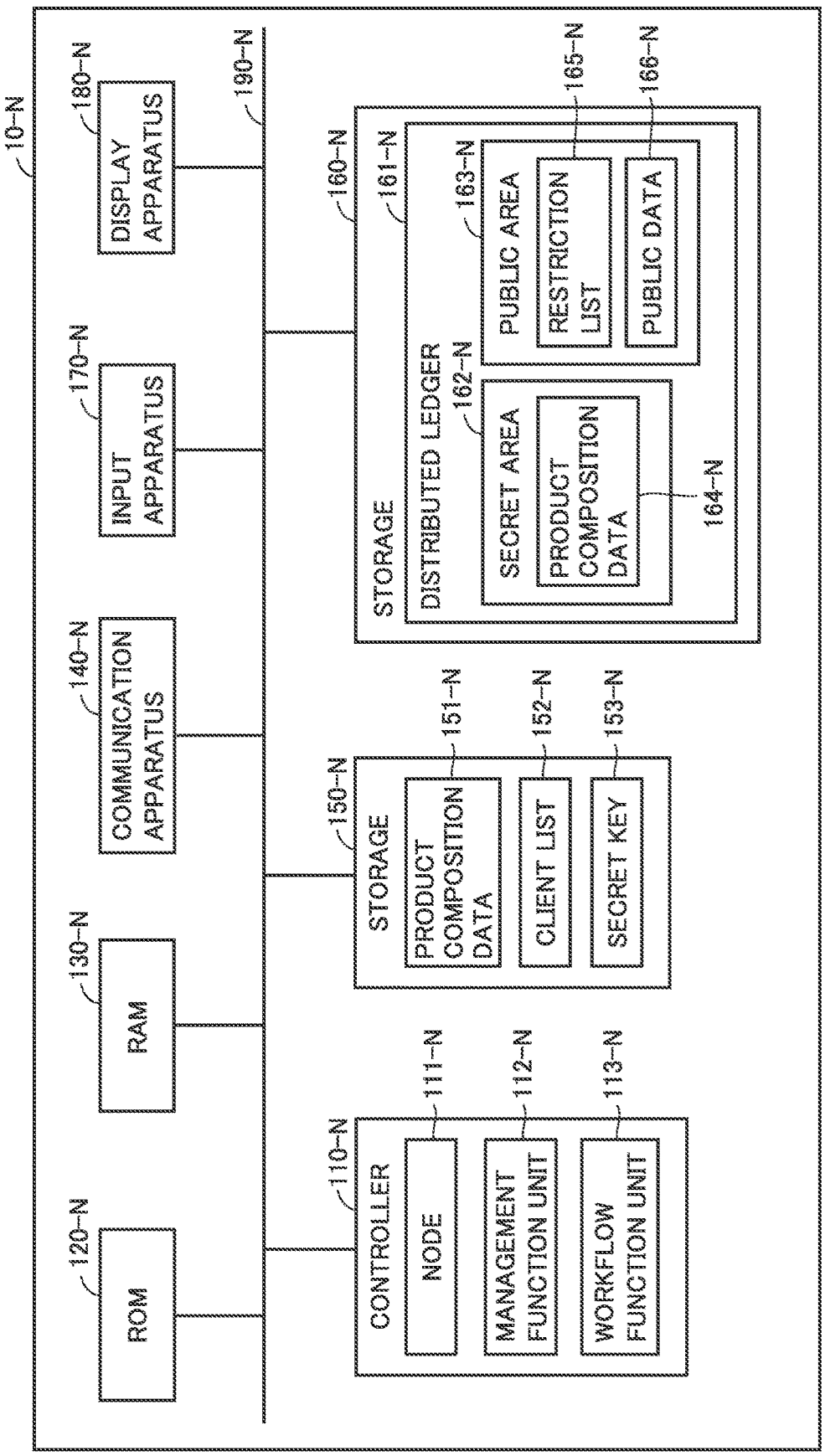
FIG. 5 is a diagram schematically showing a hardware configuration of an information management apparatus.

FIG. 5 is a diagram schematically showing a hardware configuration of information management apparatus 10-N. Information management apparatus 10-N includes a controller 110-N, a ROM 120-N, a RAM 130-N, a communication apparatus 140-N, a storage 150-N, a storage 160-N, an input apparatus 170-N, and a display apparatus 180-N. Controller 110-N, ROM 120-N, RAM 130-N, communication apparatus 140-N, storage 150-N, storage 160-N, input apparatus 170-N, and display apparatus 180-N are connected to a bus 190-N.

Controller 110-N is implemented, for example, by an integrated circuit including a CPU. Controller 110-N develops various programs stored in ROM 120-N on RAM 130-N and executes the programs. The various programs include, for example, distributed ledger platform software. RAM 130-N functions as a working memory, and various types of data necessary for execution of the various programs are temporarily stored in RAM 130-N. Controller 110-N performs various types of processing by executing a program stored in ROM 120-N.

Controller 110-N functions as node 111-N, a management function unit 112-N, and a workflow function unit 113-N by executing a program stored in ROM 120-N.

At the time of initial start-up, node 111-N generates secret key 153-N and a public key in conformity with a prescribed standard. Secret key 153-N is stored in storage 150-N. The public key is sent, for example, to network map node 53 of platform provider 30. Node 111-N performs a function to generate transaction data. Node 111-N generates an electronic signature with the use of secret key 153-N and puts the electronic signature to the transaction data. Node 111-N performs a function to approve transaction data proposed by another node. Node 111-N verifies the transaction data proposed by another node, and when it sees no problem in a result of verification, it puts the electronic signature to the transaction data and sends the transaction data back to another node. Details of each element will be described later.

Communication apparatus 140-N is configured to communicate with external equipment. The external equipment includes, for example, another information management apparatus included in distributed ledger network 2 and platform provider 30. Communication apparatus 140-N and the external equipment communicate with each other, for example, over the Internet.

Input apparatus 170-N includes an input device. The input device refers, for example, to a mouse, a keyboard, a touch panel, and/or another apparatus that can receive an operation by a user.

Display apparatus 180-N includes a display. Display apparatus 180-N shows on the display, various images in accordance with a control signal from controller 110-N. The display is, for example, a liquid crystal display, an organic EL display, or another display device.

Storage 150-N includes a storage medium such as a hard disk or a flash memory. Information stored in storage 150-N is managed off-chain (on the outside of distributed ledger network 2). Product composition data 151-N of a company's product to which it belongs, a client list 152-N, and a secret key 153-N are stored in storage 150-N. For example, in the case of information management apparatus 10-1 of the A company, product composition data 151-1 includes composition data of the A product. For example, in the case of information management apparatus 10-2 of the B company, product composition data 151-2 includes composition data of the B product. For example, in the case of information management apparatus 10-3 of the C company, product composition data 151-3 includes composition data of the C product. For example, in the case of information management apparatus 10-4 of the D company, product composition data 151-4 includes composition data of the D product. Details of product composition data 151-N will be described later, together with details of product composition data 164-N which will be described later.

Client list 152-N includes information on a company to which disclosure of information is permitted. Specifically, downstream companies that do direct business transactions in the supply chain are registered in client list 152-N. For example, in the case of information management apparatus 10-1 of the A company, no company has been registered in client list 152-1. For example, in the case of information management apparatus 10-2 of the B company, the A company has been registered in client list 152-2. For example, in the case of information management apparatus 10-3 of the C company, the B company has been registered in client list 152-3. For example, in the case of information management apparatus 10-4 of the D company, the B company has been registered in client list 152-4. No answer is given to an inquiry from a company not registered in client list 152-N. Client list 152-1 does not have to be stored in storage 150-1 of information management apparatus 10-1.

Secret key 153-N and a public key (not shown) generated by controller 110-N are stored in storage 150-N. A certificate (not shown) issued by doorman node 51 of platform provider 30 is stored in storage 150-N.

Storage 160-N includes a storage medium such as a hard disk or a flash memory. Information stored in storage 160-N is managed on-chain (in the inside of distributed ledger network 2). Distributed ledger 161-N is stored in storage 160-N.

Distributed ledger 161-N includes a secret area 162-N and a public area 163-N. Secret area 162-N is an area where transaction data shared with none of other nodes is stored, that is, an area where transaction data held only by distributed ledger 161-N itself on-chain is stored. Public area 163-N is an area where transaction data shared with at least one other node is stored on-chain.

Product composition data 164-N is stored in secret area 162-N. Product composition data 164-N is the same as product composition data 151-N stored in storage 150-N. Controller 110-N has product composition data 164-N identical in content to product composition data 151-N stored also in on-chain secret area 162-N (secret area 162-N in distributed ledger 161-N). When controller 110-N updates one of product composition data 151-N and product composition data 164-N, it also similarly updates the other. The reason why product composition data 164-N similar in contents to product composition data 151-N is stored also in secret area 162-N on-chain is because information on a chemical substance (restricted substance) newly added to restriction list 165-N can automatically be extracted from product composition data 164-N as a result of processing by node 111-N (specifically, node 111-N and management function unit 112-N in the present embodiment) on-chain. For example, node 111-N is unable to extract information on the newly designated restricted substance from product composition data 151-N stored off-chain. In order to extract the information on the newly designated restricted substance from product composition data 151-N stored off-chain, for example, a feature for extraction should separately be added or intervention by human processing is required. As product composition data 164-N is stored on-chain, node 111-N is able to extract the information on the newly designated restricted substance from product composition data 164-N. A series of processing including update of restriction list 350 by platform provider 30, update of restriction list 165-N in response to update of restriction list 350, and extraction of information on the newly designated restricted substance from product composition data 164-N based on restriction list 165-N can thus be automated in information management apparatus 1.

Restriction list 165-N and public data 166-N are stored in public area 163-N. Restriction list 165-N is updated as platform provider 30 updates restriction list 350. When node 41 of platform provider 30 adds a restricted substance newly designated as a result of revision of the laws and regulations etc. to restriction list 350 to update restriction list 350, it transmits to node 111-N of information management apparatus 10-N, transaction data that proposes addition of the newly designated restricted substance to restriction list 165-N to update restriction list 165-N. As node 111-N approves the transaction data, the transaction data is added to distributed ledger 161-N and restriction list 165-N is updated. Specifically, the transaction data is committed through a process in which notary node 55 puts the signature to the transaction data.

Public data 166-N is created by extraction of information on the restricted substance included in restriction list 165-N from product composition data 164-N. In other words, public data 166-N is information on the chemical substance included in product composition data 164-N and included in restriction list 165. Product composition data is information important for each company. The product composition data that does not have to be disclosed may be disclosed to another company, for example, due to a system error or the like. In the present embodiment, necessity for keeping secret can be determined for each prescribed unit of data included in product composition data. Data desired to be kept secret can be designated to be kept secret and data that may be disclosed can be designated not to be kept secret. When a chemical substance that has been designated to be kept secret is designated as a restricted substance, information on the chemical substance is disclosed after approval is obtained in a company with the use of a workflow function which will be described later. Therefore, more specifically, public data 166-N is information on a chemical substance (1) included in product composition data 164-N, (2) included in restriction list 165-N, and (3) designated not to be kept secret or publication of which has been approved. Information on a chemical substance other than a restricted substance may be incorporated in public data 166-N, for example, voluntarily or in response to a request for disclosure from a downstream company, on condition that approval in a company is obtained.

FIG. 6 is a diagram schematically showing exemplary product composition data 151-3 and 164-3 on the C product of the C company. Since product composition data 151-3 is the same as product composition data 164-3 as described above, product composition data 164-3 will be described below by way of example.

Product composition data 164-3 includes item information such as a product name, a product number, a constituent product number, a content ratio, and necessity for keeping secret. The product name is the C product and the product number thereof is C001. The C product contains products (chemical substances) labeled with constituent product numbers CA001 to CA004 as its composition. In the example shown in FIG. 6, the content ratio of constituent product number CA001 occupied in the C product is X1%, the content ratio of constituent product number CA002 occupied in the C product is X2%, the content ratio of constituent product number CA003 occupied in the C product is X3%, and the content ratio of constituent product number CA004 occupied in the C product is X4%. The total of the content ratios X1% to X4% is 100%. For example, when the product labeled with constituent product number CA001 further contains products labeled with constituent product numbers CB001 and CB002, the item information expressing the constituent product number may include a first tier including constituent product numbers CA001 to CA004 and a second tier including constituent product numbers included in the product labeled with the constituent product number in the first tier for each constituent product number in the first tier. In product composition data 164-3 according to the present embodiment, the item information expressing the constituent product number includes only the first tier.

The item information expressing necessity for keeping secret indicates "public" or "non-public", which is determined for each constituent product number (each constituent product number in the first tier). In other words, the constituent product number in the first tier is defined for the prescribed unit of data described above in product composition data 164-3. "Public" means that composition data (including at least the constituent product number and the content ratio) of a chemical substance is extracted from product composition data 164-3, included in public data 166-N, and stored in public area 163-N. "Non-public" means that composition data of a chemical substance is not included in public data 166-N but remains in secret area 162-N. In the example shown in FIG. 6, constituent product numbers CA001 and CA002 are designated as being public and constituent product numbers CA003 and CA004 are designated as being non-public. Chemical substances identified by constituent product numbers CA001 and CA002 are assumed as restricted substances and chemical substances identified by constituent product numbers CA003 and CA004 are not assumed as restricted substances.

Product composition data (public data 166-3) of the C product disclosed to information management apparatus 10-2 (node 111-2) of the B company by information management apparatus 10-3 (node 111-3) of the C company includes composition data of constituent product numbers CA001 and CA002 but does not include composition data of constituent product numbers CA003 and CA004.

FIG. 7 is a diagram schematically showing exemplary product composition data 151-2 and 164-2 on the B product. Since product composition data 151-2 is the same as product composition data 164-2 as described above, product composition data 164-2 will be described by way of example with reference to FIG. 7 and FIG. 10 which will be described later.

Referring to FIG. 7, product composition data 164-2 includes item information such as a product name, a product number, a constituent product number, a content ratio, and necessity for keeping secret. The product name is the B product and the product number thereof is B001. The B product includes the C product and the D product. The first tier of the constituent product number includes the C product and the product number C001 thereof and the D product and the product number D001 thereof. The content ratio of the C product in the B product is Z1% and the content ratio of the D product in the B product is Z2%. The sum of the content ratio Z1% and the content ratio Z2% is 100%.

The second tier of the constituent product number includes the composition data of the C product disclosed by the C company and the composition data of the D product disclosed by the D company. Specifically, the second tier of the constituent product number includes constituent product numbers CA001 and CA002 incorporated in public data 166-3 by the C company and constituent product numbers DA001, DA002, and DA003 incorporated in public data 166-4 by the D company. The content ratio of constituent product number CA001 in the C product is X1% and the content ratio of constituent product number CA002 in the C product is X2%. The content ratio of constituent product number DA001 in the D product is Y1%, the content ratio of constituent product number DA002 in the D product is Y2%, and the content ratio of constituent product number DA003 in the D product is Y3%. For example, when the C company does not fully disclose composition of the C product, the sum of the content ratio X1% and the content ratio X2% is not 100%. Since the C company does not disclose information on the chemical substances identified by constituent product numbers CA003 and CA004 in the present embodiment, the sum of the content ratio X1% and the content ratio X2% is not 100%.

The item information expressing necessity for keeping secret is determined for each constituent product number in the first tier. In the example in FIG. 7, for the C product, necessity for keeping secret has been designated as being public, and for the D product, necessity for keeping secret has been designated as being non-public. Specifically, though product composition data (public data 166-2) disclosed to information management apparatus 10-1 (node 111-1) of the A company by information management apparatus 10-2 (node 111-2) of the B company includes the composition data of the C product, it does not include the composition data of the D product. In other words, though public data 166-2 includes the composition data of the C product, it does not include the composition data of the D product. In spite of designation as being non-public, when the chemical substance identified by the constituent product number falls under the restricted substance, such information is included in public data 166-2 after approval for publication is obtained in approval processing. Specifically, when it is assumed that a chemical substance identified by constituent product number DA002 falls under the restricted substance, the chemical substance identified by constituent product number DA002 is incorporated in public data 166-2 as a result of approval processing. Information on the chemical substance identified by constituent product number DA002, which falls under the restricted substance, is thus appropriately disclosed to the A company.

The constituent product number in the first tier is defined for the prescribed unit of data described above in product composition data 164-2. The item information expressing necessity for keeping secret can also be set for each constituent product number in the second tier. In other words, the constituent product number in the second tier can also be defined for the prescribed unit of data.

Referring again to FIG. 5, when node 111-N receives from node 41 of platform provider 30, the transaction data that proposes incorporation of the restricted substance newly designated as a result of revision of the laws and regulations etc. into restriction list 165-N, it verifies the transaction data and thereafter approves the transaction data. Then, node 111-N has the transaction data stored in distributed ledger 161-N. The newly designated restricted substance is thus added to restriction list 165-N and restriction list 165-N is updated.

When restriction list 165-N is updated, node 111-N performs processing for checking (checking processing) whether or not information on the restricted substance added to restriction list 165-N as a result of update has to be disclosed to the downstream company. Specifically, node 111-N checks the restricted substance added to restriction list 165-N against product composition data 164-N and checks whether or not the content ratio of the added restricted substance in a product of a company to which it belongs is equal to or more than the report threshold value. When the content ratio of the restricted substance in product composition data 164-N is equal to or more than the report threshold value, node 111-N determines that the information on the restricted substance has to be disclosed to the downstream company. When the content ratio of the restricted substance in product composition data 164-N is less than the report threshold value, node 111-N determines that the information on the restricted substance does not have to be disclosed to the downstream company. When node 111-N confirms that update of restriction list 165-N affects itself, node 111-N notifies management function unit 112-N of that fact. Management function unit 112-N can also perform the function to perform checking processing. In this case, for example, when management function unit 112-N senses update of restriction list 165-N by node 111-N, it performs checking processing with the use of product composition data 151-N.

The upstream company does not fully disclose product composition data to the downstream company. There is possibility that the composition data kept secret by the upstream company includes the presently added new restricted substance. Therefore, for accurate checking processing, whether or not there is composition data kept secret by the upstream company should be checked, and when there is composition data kept secret by the upstream company, whether or not the secret composition data includes the new restricted substance should be checked, details of which will be described later.

When a company is supplied with a product from an upstream company for manufacturing of the company's product, in checking processing, node 111-N estimates that there is possibility that the product (supplied product) supplied by the upstream company contains the new restricted substance. Node 111-N transmits transaction data including a request for disclosure of information on the new restricted substance to the node of the upstream company. When node 111-N obtains information indicating that the supplied product contains the new restricted substance from the node of the upstream company, it outputs a request for output of an alert to management function unit 112-N. The alert serves to inform each department or a person in charge or the like of approval processing in the company being necessitated by addition of the new restricted substance.

When node 111-N obtains transaction data including public data including information on the new restricted substance from the node of the upstream company, it updates product composition data 164-N with the information on the new restricted substance.

When node 111-N receives the transaction data including the request for disclosure of the new restricted substance from the downstream company, it determines whether or not a product of a company to which it belongs, that is supplied to the downstream company, contains the new restricted substance (specifically, whether or not the content ratio of the new restricted substance is equal to or more than the report threshold value) based on product composition data 164-N. When the company's product supplied to the downstream company contains the new restricted substance, node 111-N initially transmits transaction data including information indicating that the company's product contains the new restricted substance (indicating presence of information to be disclosed) to the node of the downstream company. Node 111-N then issues a request for output of the alert to trigger approval processing for disclosure of information on the new restricted substance, and when approval for disclosure is obtained in the approval processing, node 111-N transmits transaction data including public data 166-N updated to incorporate information on the new restricted substance to the node of the downstream company.

Management function unit 112-N outputs the alert in response to the output request from node 111-N. As the alert is outputted (workflow function unit 113-2 senses the alert), the workflow function which will be described later is activated (started). As the workflow function is activated, approval processing is enabled.

When approval for disclosure of the information on the new restricted substance is obtained in the approval processing, management function unit 112-N performs processing for reading (reading processing) information (client information) on the downstream company from storage 150-N. Specifically, management function unit 112-N reads the client information by referring to client list 152-N stored in storage 150-N. The function to perform reading processing by management function unit 112-N can also be performed by node 111-N. In this case, for example, information similar to client list 152-N is stored also in secret area 162-N in distributed ledger 161-N stored in storage 160-N. In other words, information similar to client list 152-N is also stored on-chain. Node 111-N can thus read client information from distributed ledger 161-N.

Workflow function unit 113-N notifies a client apparatus group (FIG. 8 which will be described later) of start and end of the workflow function. The workflow function refers to a function for automating a process for obtaining approval for disclosure of information on the restricted substance in a company (including an associated company). When workflow function unit 113-N obtains with its workflow function, approval for disclosure of information on the restricted substance added to restriction list 165-N from client apparatus 12-N in the approval department, it notifies management function unit 112-N of that fact. The workflow function is applicable also to disclosure of information on a chemical substance other than the restricted substance.

When management function unit 112-N receives an approval notification from workflow function unit 113-N, it requests node 111-N to update public data 166-N.

When node 111-N receives the request for update of public data 166-N, it adds information on the restricted substance, for which approval for information disclosure has been obtained, to update public data 166-N. Then, node 111-N generates transaction data including public data 166-N and transmits the transaction data to the node of a target downstream company. When the node of the downstream company approves the transaction data, public data 166-N is disclosed to the downstream company. In other words, information on the added restricted substance is reported to the downstream company. Information on the chemical substance (the restricted substance in the present embodiment) is disclosed to the downstream company by the upstream company. Node 111-N may generate transaction data including information on the restricted substance for which approval for information disclosure has been obtained, and transmit the transaction data to the node of the target downstream company.

When workflow function unit 113-N senses approval by client apparatus 12-N in the approval department, it notifies the client apparatus group (the plurality of client apparatuses 12-N) of end of the workflow. The workflow function thus ends.

Figure 8:
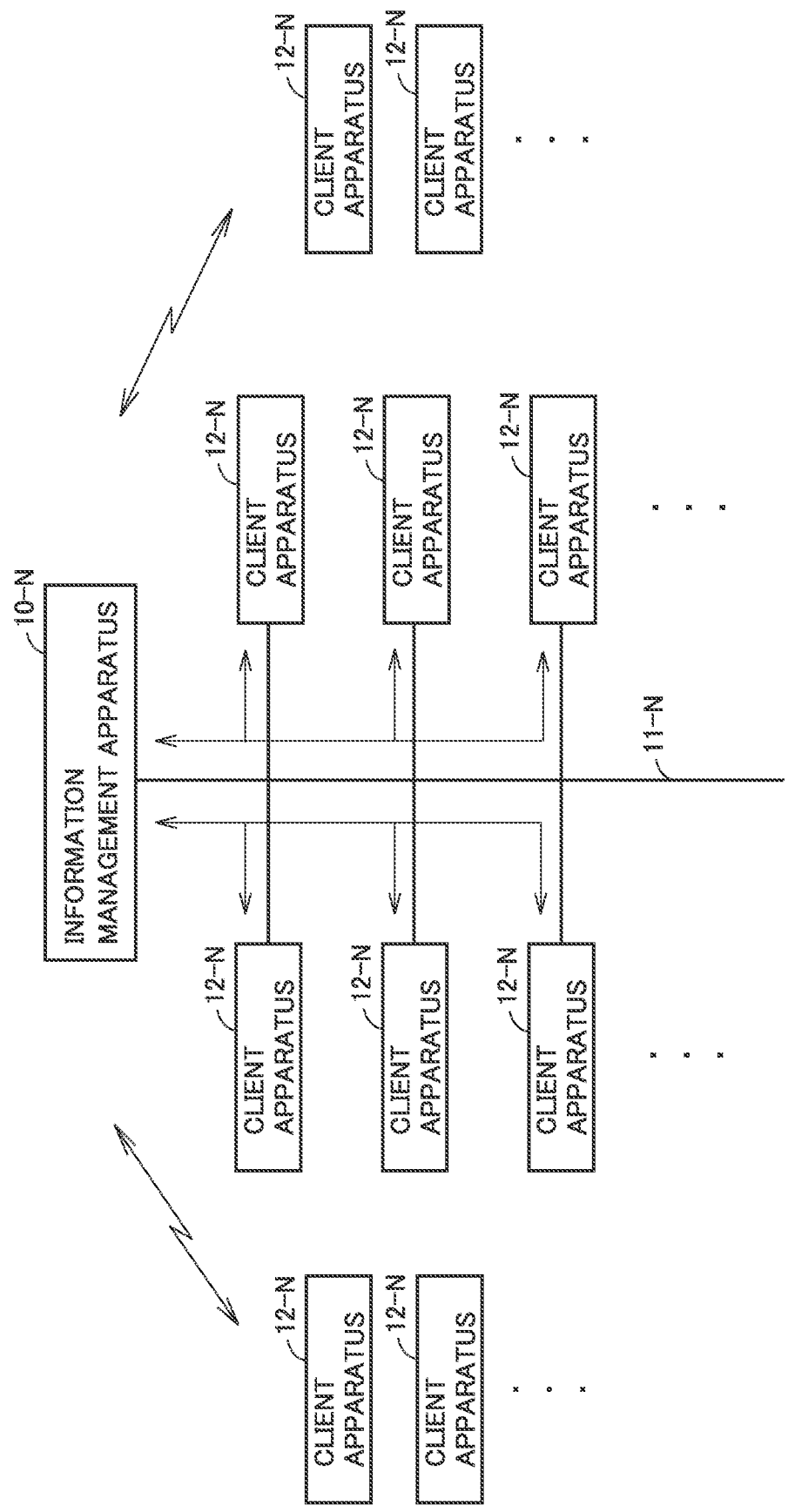
FIG. 8 is a diagram for illustrating a workflow function.

FIG. 8 is a diagram for illustrating the workflow function. Referring to FIG. 8, a plurality of client apparatuses 12-N are connected to information management apparatus 10-N to establish wireless or wired communication. Information management apparatus 10-N and client apparatus 12-N capable of establishing wired communication are each connected to a bus 11-N.

Each of the plurality of client apparatuses 12-N is a terminal apparatus belonging to a company the same as the company that manages information management apparatus 10-N or a company associated therewith. The plurality of client apparatuses 12-N belong, for example, to departments different from one another. Specifically, in an example of information management apparatus 10-2 of the B company, the plurality of client apparatuses 12-2 belong, for example, to departments different from one another in the B company.

When a new restricted substance is designated as a result of revision of laws and regulations etc., approval for disclosure of information on the new restricted substance to the outside (the downstream company) should be obtained in the company. A department having approval authority for disclosure of information on the chemical substance may be different for each chemical substance.

Information management apparatus 10-N incorporates web application software (which is also simply referred to as a "web app" below). Each of the plurality of client apparatuses 12-N uses the web app through a web browser. The workflow function in the present embodiment is performed with the use of the web app. When information management apparatus 10-N (workflow function unit 113-N) starts the workflow function, it notifies the client apparatus group (the plurality of client apparatuses 12-N) of start of the workflow.

Client apparatus 12-N of the department having the approval authority (approval department) is set in advance for each chemical substance contained in composition of a product. Each of the plurality of client apparatuses 12-N refers to the web app every prescribed cycle after it receives a notification about start of the workflow until it receives a notification about end of the workflow. Information management apparatus 10-N discloses information on the newly designated restricted substance to the plurality of client apparatuses 12-N with the use of the web app. Each of the plurality of client apparatuses 12-N determines whether or not a department to which it belongs is the approval department that approves disclosure of information on the newly designated restricted substance. Client apparatus 12-N belonging to the approval department performs approval processing when the restricted substance, disclosure of information on which is approved by the client apparatus itself, is newly designated. Thereafter, client apparatus 12-N approves disclosure to the downstream company, of information on the restricted substance contained in the product of the company to which it belongs. The approval processing may include, for example, processing for checking whether or not a content of the restricted substance in the company's product is equal to or more than a report threshold value. The report threshold value refers to a threshold value of a ratio (a content ratio) of the subject substance contained per unit amount of the product. The prescribed value is determined, for example, under the laws and regulations etc. The upstream company is obliged to disclose information on the restricted substance in its product to the downstream company when the content of the restricted substance is equal to or more than the prescribed value. The report threshold value can be the prescribed value. The approval processing may be performed automatically by a program incorporated in client apparatus 12-N or manually by a manager (employee) of a management department of client apparatus 12-N.

When information management apparatus 10-N (workflow function unit 113-N) senses approval by client apparatus 12-N in the approval department, it notifies the client apparatus group (the plurality of client apparatuses 12-N) of end of the workflow. The workflow function thus ends.

Information management apparatus 10-N (node 111-N) generates transaction data that reports product composition data (public data 166-N) including information on the restricted substance, for which approval for information disclosure has been obtained, and transmits the transaction data to the node of the downstream company. Information on the restricted substance is thus reported to the downstream company. When a restricted substance is newly designated, only information on the restricted substance may be reported from the upstream company to the downstream company, or product composition data (public data 166-N) to which information on the restricted substance has been added may be reported from the upstream company to the downstream company.

Figure 9:
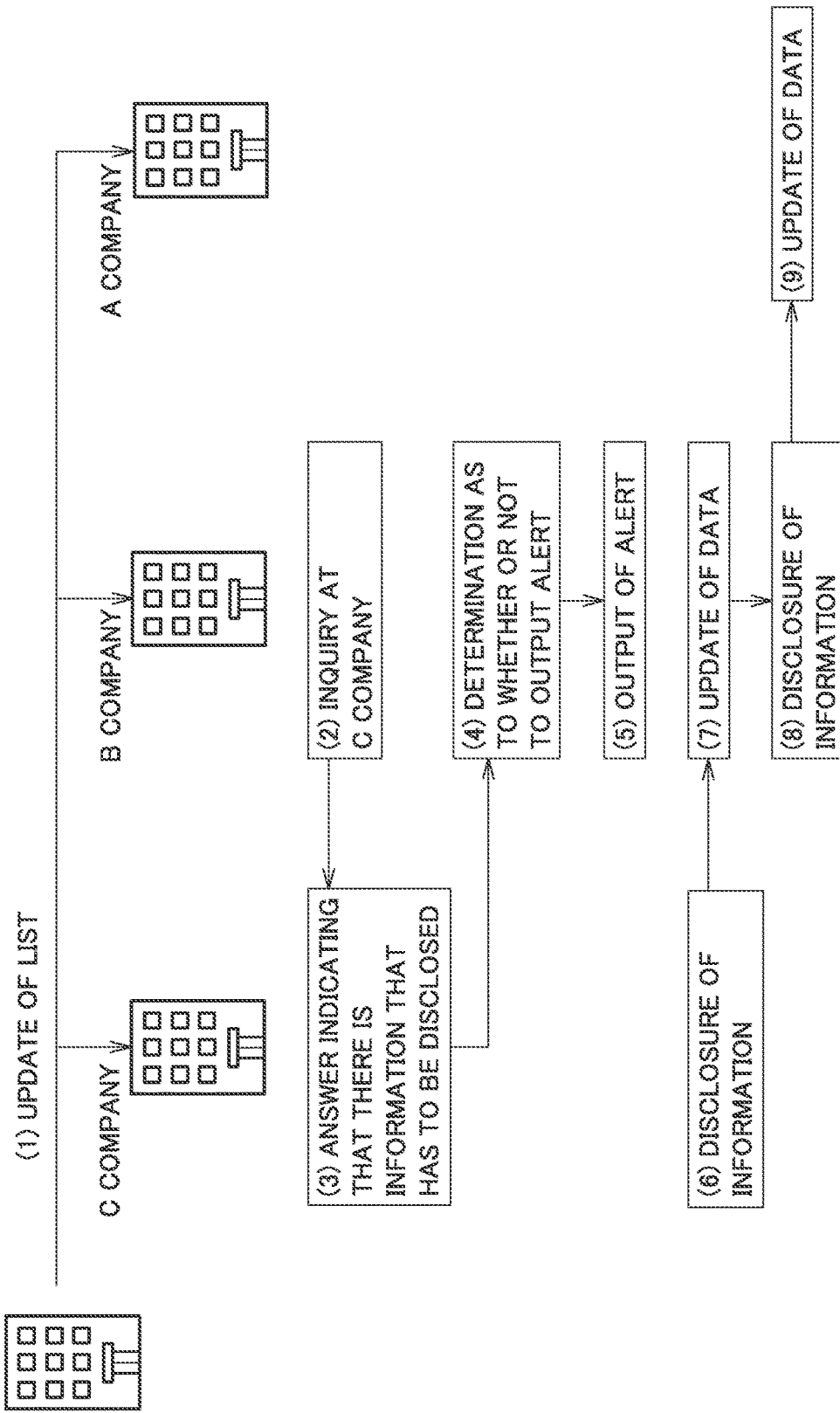
FIG. 9 is a diagram schematically showing a flow of processing in the information management system when a new restricted substance is designated.

FIG. 9 is a diagram schematically showing a flow of processing in information management system 1 when a new restricted substance is designated. FIG. 9 illustrates processing in the A to C companies by way of example for the sake of facilitated understanding.

(1) Platform provider 30 senses addition of a new restricted substance and transmits transaction data that proposes addition of the new restricted substance to restriction list 165-N to each of information management apparatuses 10-1 to 10-3. Information management apparatuses 10-1 to 10-3 approve the transaction data and update restriction lists 165-1 to 165-3, respectively.

(2) Information management apparatus 10-2 of the B company estimates that there is possibility that the C product supplied by the C company contains the new restricted substance. Information management apparatus 10-2 generates transaction data that asks whether or not the C product contains the new restricted substance and transmits the transaction data to information management apparatus 10-3. Though FIG. 9 does not show the D company, information management apparatus 10-2 similarly transmits transaction data that asks whether or not the D product contains the new restricted substance to information management apparatus 10-4.

(3) Information management apparatus 10-3 of the C company generates transaction data that gives an answer about whether or not there is information that has to be disclosed to the B company and transmits the transaction data to information management apparatus 10-2. Information management apparatus 10-3 determines whether or not the C product contains the new restricted substance, for example, based on updated restriction list 165-N and product composition data 164-3. When the C product does not contain the restricted substance, information management apparatus 10-3 transmits transaction data indicating absence of information to be disclosed to information management apparatus 10-2. In this case, information management apparatus 10-2 quits the process because further processing necessitated by addition of the new restricted substance does not have to be performed.

When the C product contains the restricted substance, information management apparatus 10-3 transmits to information management apparatus 10-2, transaction data indicating presence of information to be disclosed. Information management apparatus 10-3 activates the workflow function which will be described later in response to update of restriction list 165-N (addition of the new restricted substance) or in response to the inquiry in (2), and prepares for disclosure of product composition data of the C product including information on the new restricted substance. In (3), product composition data is not disclosed, but an indication of presence of information to be disclosed is given to the B company.

(4) Information management apparatus 10-2 of the B company determines whether or not it has to output an alert. The alert serves to inform each department or a person in charge or the like of approval processing in the company necessitated by addition of the new restricted substance. When the answer (transaction data) from information management apparatus 10-3 of the C company indicates absence of information to be disclosed, information management apparatus 10-2 quits the process because a report to the A company necessitated by addition of the new restricted substance does not have to be given. When information management apparatus 10-2 receives an inquiry corresponding to the processing in (2) from information management apparatus 10-1 of the A company, it transmits to information management apparatus 10-1, transaction data indicating absence of information to be disclosed.

(5) When the answer (transaction data) from information management apparatus 10-3 of the C company indicates presence of information to be disclosed, information management apparatus 10-2 of the B company outputs the alert. As the alert is outputted, the workflow function which will be described later is activated (started).

(6) The C company is now ready for disclosure of the product composition data of the C product including information on the new restricted substance, and in the C company, public data 166-3 is updated. Specifically, transaction data including updated public data 166-3 is transmitted from information management apparatus 10-3 to information management apparatus 10-2. Detailed description will be given, on the assumption that a chemical substance identified by constituent product number CA003 in FIG. 6 is added as the restricted substance to restriction lists 350 and 165-N. For the chemical substance identified by constituent product number CA003, the item information expressing necessity for keeping secret has been designated as being non-public. Therefore, even when the chemical substance is added to restriction list 165-3, it is not automatically disclosed to the downstream company but approval for disclosure thereof should be obtained in the company. As described above, information management apparatus 10-3 (information management apparatus 10-N) performs the workflow function to automate the process for obtaining approval for disclosure of information on the restricted substance.

When information management apparatus 10-3 senses approval by client apparatus 12-3 in the approval department, it determines to set the item information expressing necessity for keeping secret in connection with the chemical substance identified by constituent product number CA003 from non-public to public. Node 111-3 of information management apparatus 10-3 extracts the composition data of the chemical substance (restricted substance) identified by constituent product number CA003 from product composition data 164-3 and has the composition data of the chemical substance identified by constituent product number CA003 incorporated in public data 166-3. Node 111-3 of information management apparatus 10-3 generates transaction data that reports public data 166-3 (product composition data including information on the restricted substance, for which approval for information disclosure has been obtained), and transmits the transaction data to the node of the downstream company (node 111-2 of the B company). Information on the chemical substance identified by constituent product number CA003, which is the newly added restricted substance, is thus reported to the downstream company.

(7) Information management apparatus 10-2 of the B company approves the transaction data and obtains the updated composition data on the C product. Information management apparatus 10-2 of the B company updates product composition data 151-2 and 164-2 on the B product.

FIG. 10 is a diagram schematically showing exemplary updated product composition data 151-2 and 164-2 on the B product. Description will be given with reference to FIGS. 9 and 10.

As shown in FIG. 10, the composition data of constituent product number CA003 in connection with the C product is added to product composition data 151-2 and 164-2. Specifically, constituent product number CA003 and the content ratio X3% thereof in connection with the C product are added to product composition data 164-2. The item information expressing necessity for keeping secret in connection with the C product has been designated as being public. In other words, the composition data of the C product is included in public data 166-2. Therefore, (8) node 111-2 extracts the composition data of constituent product number CA003 from product composition data 164-2 and has the composition data incorporated in public data 166-2. Node 111-2 transmits the transaction data that discloses public data 166-2, to which the composition data of constituent product number CA003 has been added, to node 111-1 of the A company. As node 111-1 approves the transaction data, the transaction data is added to distributed ledger 161-1 and the composition data of constituent product number CA003 is disclosed to node 111-1. (9) Node 111-1 adds the composition data of constituent product number CA003 to update product composition data 164-1. Furthermore, management function unit 112-1 updates product composition data 151-1 as product composition data 164-1 is updated. Thus, when the C company which is the upstream company discloses the composition data of the chemical substance identified by constituent product number CA003 in connection with the C product and when the item information expressing necessity for keeping secret in connection with the C product has been designated as being public in advance, node 111-2 automatically discloses the composition data of constituent product number CA003 to node 111-1 of the A company which is the downstream company. In other words, when the item information expressing necessity for keeping secret in connection with the C product has been designated as being public before reception from node 111-3 of the C company, of transaction data that discloses public data 166-3, to which composition data of constituent product number CA003 has been added, node 111-2 automatically discloses the composition data of constituent product number CA003 to node 111-1 of the A company. "Automatic" means that node 111-2 transmits transaction data that discloses public data 166-2, to which the composition data of constituent product number CA003 has been added, to node 111-1 of the A company upon reception of the transaction data from node 111-3 of the C company. In other words, node 111-2 transmits the transaction data that discloses public data 166-2, to which the composition data of constituent product number CA003 has been added, to node 111-1 of the A company without performing approval processing.

On the assumption that the item information expressing necessity for keeping secret in connection with the C product has been designated as being non-public, when the C company which is the upstream company discloses the composition data of the chemical substance identified by constituent product number CA003 in connection with the C product, node 111-2 does not automatically disclose the composition data of constituent product number CA003 to node 111-1 of the A company which is the downstream company. In this case, node 111-2 waits for approval (that is, approval processing) for publication of the composition data of the C product with the workflow function. When approval for publication of the composition data of the C product is obtained as a result of approval processing, node 111-2 discloses the composition data of the C product to node 111-1 of the A company.

<Sequence Diagram>

Figure 11:
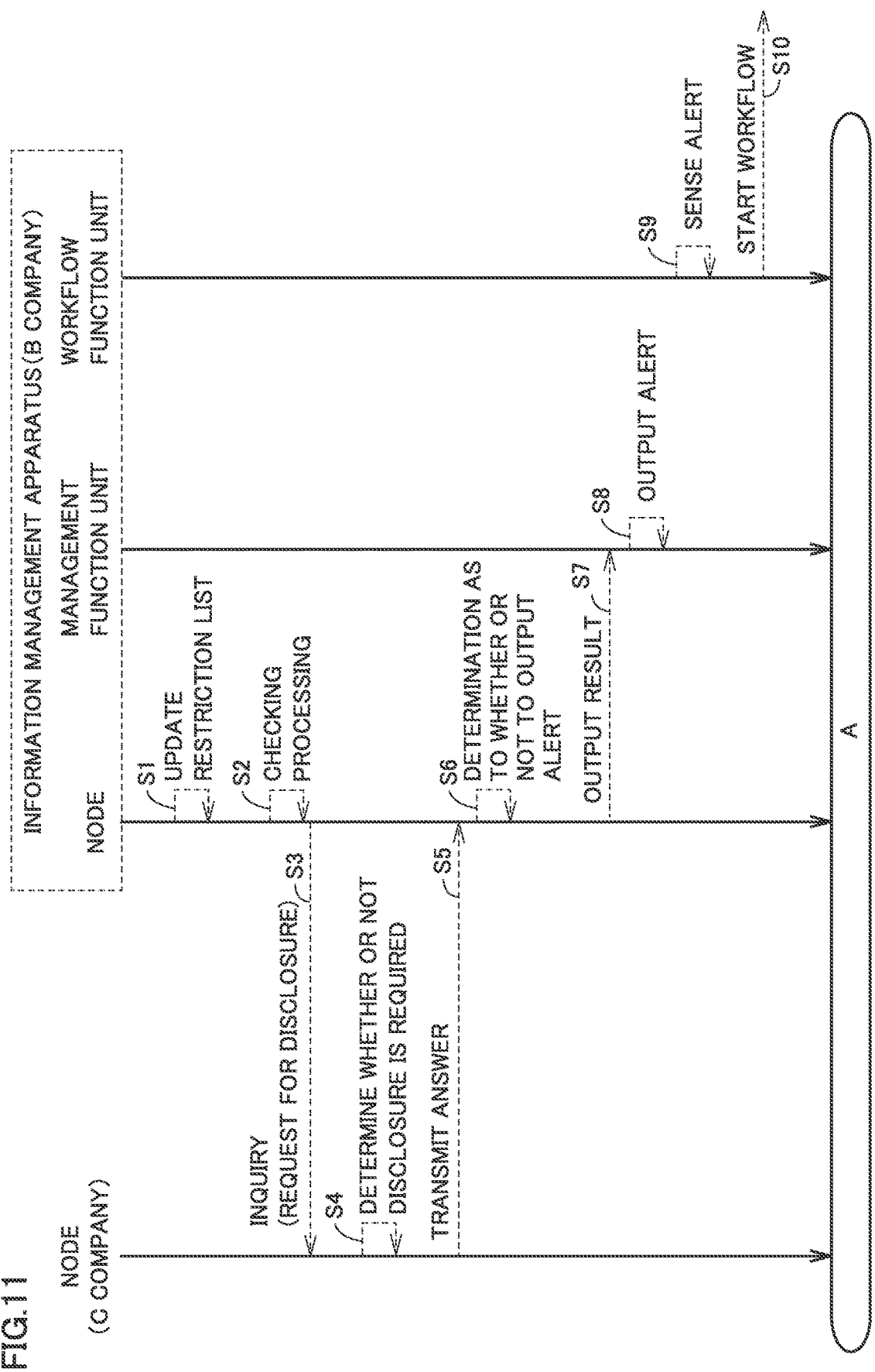
FIG. 11 is a sequence diagram (No. 1) showing a flow of a series of processing performed when a new restricted substance is added.
Figure 12:
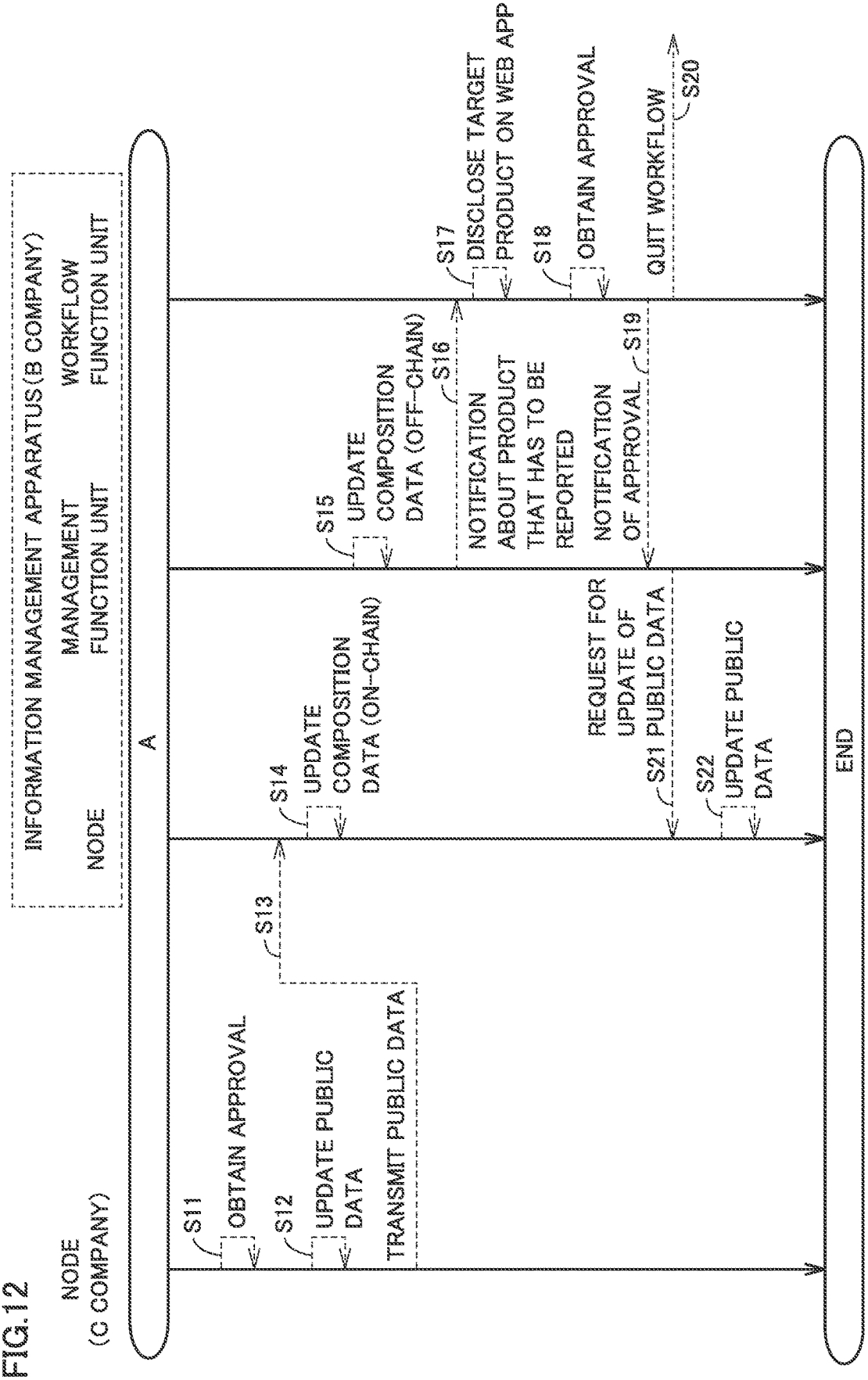
FIG. 12 is a sequence diagram (No. 2) showing the flow of the series of processing performed when the new restricted substance is added.

FIGS. 11 and 12 are sequence diagrams showing a flow of a series of processing performed when a new restricted substance is added. Processing shown in FIGS. 11 and 12 is started upon reception of transaction data that proposes update of restriction list 165-N transmitted from node 41 of platform provider 30. FIGS. 11 and 12 illustrate information management apparatus 10-2 of the B company by way of example.

In S1, node 111-2 of information management apparatus 10-2 approves the transaction data received from node 41 of platform provider 30 and updates restriction list 165-2.

In S2, node 111-2 of information management apparatus 10-2 starts checking processing. Initially, node 111-2 determines (estimates) whether or not there is possibility that the C product supplied by the C company contains the new restricted substance. In the present embodiment, node 111-2 estimates that there is possibility that the C product contains the new restricted substance based on the fact that the C company does not fully disclose the product composition data thereof but is highly likely to keep at least a part of the product composition data secret. In the present embodiment, when restriction list 165-2 is updated, node 111-2 estimates that there is possibility that the restricted substance added to restriction list 165-2 as a result of update is contained in the supplied product (the C product or the D product) supplied by the upstream company. In other words, as restriction list 165-2 is updated, node 111-2 estimates that there is possibility that the B product of the company to which it belongs contains the new restricted substance.

In S3, node 111-2 generates transaction data that asks whether or not the C product contains the new restricted substance (transaction data that requests for disclosure of information on the new restricted substance) and transmits the transaction data to node 111-3 of information management apparatus 10-3. Node 111-2 similarly transmits transaction data that asks whether or not the D product contains the new restricted substance also to node 111-4 of information management apparatus 10-4.

In S4, node 111-3 of information management apparatus 10-3 determines whether or not there is information on the chemical substance that has to be disclosed to the B company as a result of present update of restriction list 165-3, in response to the inquiry from node 111-2 of the B company. Specifically, node 111-3 checks the restricted substance, the inquiry about which it received, against product composition data 164-3, and checks whether or not the content ratio of the added restricted substance in the C product is equal to or more than the report threshold value. When the content ratio of the restricted substance in product composition data 164-3 is equal to or more than the report threshold value, node 111-3 determines that information on the restricted substance has to be disclosed to the B company. When the content ratio of the restricted substance in product composition data 164-3 is less than the report threshold value, node 111-3 determines that information on the restricted substance does not have to be disclosed to the downstream company.

In S5, when the C product does not contain the restricted substance at the content ratio equal to or more than the report threshold value, node 111-3 transmits to node 111-2, transaction data indicating absence of information to be disclosed. In this case, node 111-3 quits the process because further processing necessitated by addition of the new restricted substance does not have to be performed. When the C product contains the restricted substance at the content ratio equal to or more than the report threshold value, node 111-3 transmits to node 111-2, transaction data indicating presence of information to be disclosed (indicating subsequent disclosure of information on the new restricted substance). In this case, information management apparatus 10-3 of the C company performs processing for disclosure of information in FIG. 13 which will be described later.

For example, when the C company purchases a material or the like for the C product from a further upstream company, node 111-3 should only perform processing in S4 and S5 based on product composition data 164-N updated in processing similar to processing in S2 to S13.

In S6, node 111-2 of information management apparatus 10-2 determines whether or not it has to output an alert. When the answer (transaction data) from information management apparatus 10-3 of the C company indicates absence of information to be disclosed, node 111-2 determines that it does not have to output the alert. When the answer (transaction data) from information management apparatus 10-3 of the C company indicates presence of information to be disclosed, node 111-2 determines that it has to output the alert.

In S7, node 111-2 outputs a signal indicating a result of determination as to whether or not to output the alert to management function unit 112-2.

When node 111-3 also performs checking processing and makes determination as to whether or not to output the alert in update of restriction list 165-3 therein, in S4, node 111-3 may make determination as to necessity for disclosure by further using the result about whether or not to output the alert, and in S5, node 111-3 may give the answer.

In S8, when management function unit 112-2 receives the signal indicating that the alert does not have to be outputted, it quits the process because the report to the A company necessitated by addition of the new restricted substance does not have to be given. When management function unit 112-2 receives the signal indicating that the alert has to be outputted, it outputs the alert. Management function unit 112-2 sets, for example, a flag indicating the alert (in this case, the alert may be read as the flag).

In S9, workflow function unit 113-2 senses output of the alert. Workflow function unit 113-2 monitors whether or not the alert has been outputted, for example, every prescribed cycle.

In S10, workflow function unit 113-2 notifies the client apparatus group of start of the workflow. When each of a plurality of client apparatuses 12-2 included in the client apparatus group receives the notification of start, it refers to the web app every prescribed cycle. At this time point, information to be subjected to approval processing has not yet been disclosed on the web app. Each of client apparatuses 12-2 waits for disclosure of information of interest on the web app.

In S11, node 111-3 of information management apparatus 10-3 obtains approval for disclosure of product composition data 164-3 on the C product including information on the new restricted substance.

In S12, node 111-3 extracts the information on the new restricted substance from product composition data 164-3 on the C product and incorporates the information into public data 166-3 to update public data 166-3.

In S13, node 111-3 transmits transaction data including updated public data 166-3 to node 111-2 of information management apparatus 10-2. Details of processing in S11 and S12 will be described later with reference to FIG. 13.

In S14, node 111-2 of information management apparatus 10-2 approves the transaction data to obtain public data 166-3, and updates product composition data 164-2 therewith.

In S15, management function unit 112-2 of information management apparatus 10-2 updates product composition data 151-2 as product composition data 164-2 is updated.

In S16, management function unit 112-2 gives workflow function unit 113-2, information on the restricted substance (information of interest) to be reported to the downstream company.

In S17, workflow function unit 113-2 discloses on the web app, the information on the restricted substance (that is, the restricted substance newly designated as a result of revision of the laws and regulations etc.) that has been given in S16.

In S18, workflow function unit 113-2 obtains approval for disclosure (publication) to the downstream company, of the information on the restricted substance disclosed on the web app from client apparatus 12-2 in the approval department in connection with the added restricted substance in the client apparatus group.

In S19, workflow function unit 113-2 transmits to management function unit 112-2, a notification indicating that approval for disclosure of information on the new restricted substance has been obtained.

In S20, workflow function unit 113-2 notifies the client apparatus group of end of the workflow. When each of the plurality of client apparatuses 12-N included in the client apparatus group receives the notification of end, it quits reference to the web app.

In S21, management function unit 112-2 requests node 111-2 to update public data 166-2.

In S22, node 111-2 adds the information on the restricted substance, disclosure of information on which has been approved, and updates public data 166-2. Node 111-2 then generates transaction data including public data 166-2 and transmits the transaction data to node 111-1 of the A company. As node 111-1 of the A company approves the transaction data, public data 166-2 is disclosed to the A company. In other words, information on the added restricted substance is disclosed to the A company. In S22, node 111-2 may generate transaction data including information on the restricted substance, disclosure of information on which has been approved, and transmits the transaction data to node 111-1 of the A company. In the present embodiment, processing from S1 to S10 may automatically be performed and processing in S11 or later may manually be performed at least in part.

Figure 13:
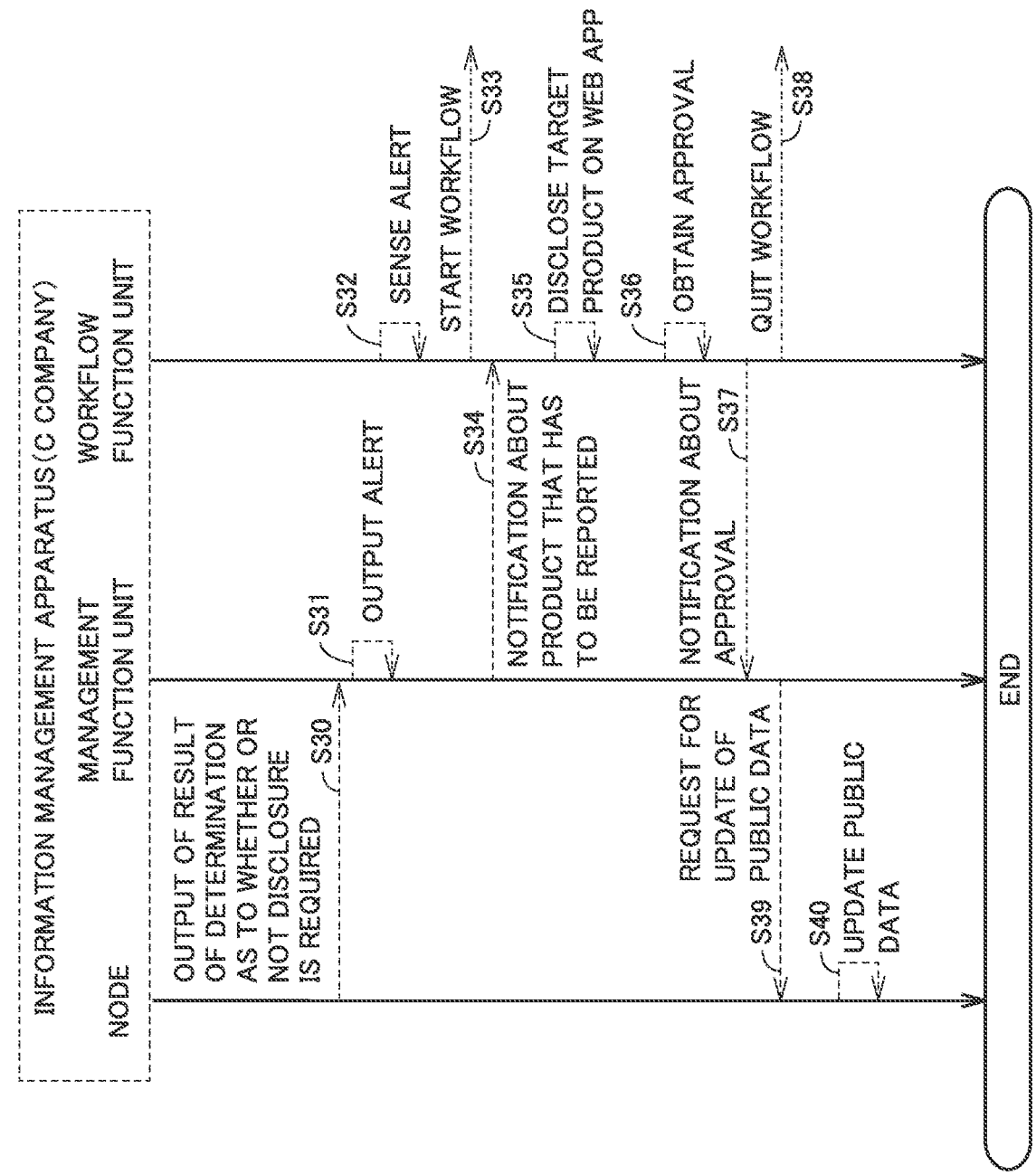
FIG. 13 is a diagram for illustrating details of processing in S11 and S12 in FIG. 12.

FIG. 13 is a diagram for illustrating details of processing in S11 and S12 in FIG. 12.

In S30, node 111-3 outputs a result of determination (a result in S4 in FIG. 11) as to necessity of disclosure to management function unit 112-3.

In S31, when management function unit 112-3 receives the signal indicating necessity for disclosure, it outputs the alert. When management function unit 112-3 receives the signal indicating unnecessity for disclosure, it quits the process because a report to the B company does not have to be made.

In S32, workflow function unit 113-3 senses output of the alert. Workflow function unit 113-3 monitors whether or not the alert has been outputted, for example, every prescribed cycle.

In S33, workflow function unit 113-3 notifies the client apparatus group of start of the workflow. When each of a plurality of client apparatuses 12-3 included in the client apparatus group receives the notification of start, it refers to the web app every prescribed cycle.

Since processing in S34 to S40 is equivalent to processing from S16 to S22 in FIG. 12, description will not be repeated.

As set forth above, in information management system 1 according to the present embodiment, when platform provider 30 updates restriction list 350 and information management apparatus 10-N receives transaction data that proposes update of restriction list 165-N from platform provider 30, information management apparatus 10-N adds the new restricted substance to restriction list 165-N. Information management apparatus 10-N then estimates whether or not there is possibility that the new restricted substance is contained in a product of a company to which it belongs. In the present embodiment, based on a notion that information on a chemical substance particularly important in each company is kept secret, when a new restricted substance is added to restriction list 165-N, information management apparatus 10-N estimates that there is possibility that the new restricted substance is contained in the product purchased from the upstream company and included in the company's product, and estimates that there is possibility that the new restricted substance is contained in the company's product. Information management apparatus 10-N transmits to the upstream company, transaction data including a request for disclosure of information on the new restricted substance included in a product of the upstream company. Conventionally, when a new restricted substance is added to restriction list 165-N, a person in charge has had to perform a large amount of processing such as an inquiry directed to the upstream company about whether or not the restricted substance is contained and a request for disclosure of information. Automation of processing performed from addition of the new restricted substance to restriction list 165-N at least until output of the alert can reduce human works by the person in charge for each type of processing for the inquiry or checking. Avoidance of output of the alert when there is no possibility that a company's product contains the new restricted substance can also reduce human works. Application of information management system 1 according to the present embodiment to the supply chain can reduce the number of man-hours for works.

A certain time period is required for an upstream company to perform approval processing or the like before it discloses the new restricted substance to a downstream company. Information management apparatus 10-N of the upstream company that has received transaction data including the request for disclosure initially transmits information indicating whether or not there is information to be disclosed (information indicating presence of information to be disclosed or information indicating absence of information to be disclosed) to the downstream company. The downstream company can thus recognize early whether or not its product contains the new restricted substance.

When information management apparatus 10-N receives from the upstream company as the answer, transaction data indicating presence of information to be disclosed, it outputs the alert. As the alert is outputted, each department or each person in charge in the company can recognize processing (approval processing) necessitated in connection with disclosure of information on the chemical substance.

[First Modification]

In the embodiment, based on a notion that information on a chemical substance particularly important in each company is kept secret, when a new restricted substance is added to restriction list 165-N, information management apparatus 10-N estimates that there is possibility that the new restricted substance is contained in a product purchased from the upstream company and included in the company's product. Therefore, when the new restricted substance is added to restriction list 165-N, information management apparatus 10-N estimates that there is possibility that the company's product contains the new restricted substance and transmits transaction data including a request for disclosure of information on the new restricted substance to the upstream company. In information management system 1 according to a first modification, information management apparatus 10-N estimates whether or not there is possibility that the company's product contains the new restricted substance based on information indicating whether or not there is non-public information that has been transmitted in advance from the upstream company.

When there is information on the chemical substance to be kept secret from a downstream company, information management apparatus 10-N (node 111-N) incorporates information indicating presence of non-public information into public data 166-N. When there is no information on the chemical substance to be kept secret from the downstream company, information management apparatus 10-N does not incorporate information indicating presence of non-public information into public data 166-N. Alternatively, when there is no information on the chemical substance to be kept secret from the downstream company, information management apparatus 10-N may incorporate information indicating absence of non-public information into public data 166-N.

Description will be given, for example, with reference to the example shown in FIG. 6. Information management apparatus 10-3 keeps information on the chemical substances identified by constituent product numbers CA003 and CA004 secret from the B company. In this case, information management apparatus 10-3 incorporates into public data 166-3, information indicating presence of non-public information in the product composition data, together with product composition data on the C product including information on the chemical substances identified by constituent product numbers CA001 and CA002.

When information management apparatus 10-3 discloses to the B company, for example, information on both of the chemical substances identified by constituent product numbers CA003 and CA004, it incorporates into public data 166-3, information indicating absence of non-public information in the product composition data, together with product composition data on the C product including information on the chemical substances identified by constituent product numbers CA001 to CA004.

When information management apparatus 10-N of the downstream company adds the new restricted substance to restriction list 165-N as proposed by platform provider 30, it performs checking processing according to the first modification. In the checking processing, the information management apparatus determines whether or not information indicating presence of the non-public information has been disclosed by the upstream company. When the information indicating presence of non-public information is disclosed by the upstream company, information management apparatus 10-N of the downstream company estimates that there is possibility that the downstream company's product contains the new restricted substance. When information indicating presence of the non-public information has not been disclosed by the upstream company (information indicating absence of non-public information has been disclosed), information management apparatus 10-N of the downstream company estimates that there is no possibility that the downstream company's product contains the new restricted substance. When information indicating whether or not there is non-public information is disclosed by information management apparatus 10-N of the upstream company, information management apparatus 10-N of the downstream company should only have this disclosed information stored in storage 160-N in association with product composition data 164-N of the downstream company.

For example, with reference to information management apparatus 10-2 (node 111-2) of the B company by way of example, when both of information management apparatus 10-3 (node 111-3) of the C company and information management apparatus 10-4 (node 111-4) of the D company disclose information indicating absence of non-public information, information management apparatus 10-2 (node 111-2) estimates that there is no possibility that that the B product contains the new restricted substance.

When at least one of information management apparatus 10-3 (node 111-3) of the C company and information management apparatus 10-4 (node 111-4) of the D company discloses information indicating presence of non-public information, information management apparatus 10-2 (node 111-2) estimates that there is possibility that the B product contains the new restricted substance. In this case, information management apparatus 10-2 (node 111-2) transmits transaction data that requests disclosure of information on the new restricted substance (transaction data that asks whether or not the new restricted substance is contained) to the node that has disclosed the information indicating presence of non-public information.

Figure 14:
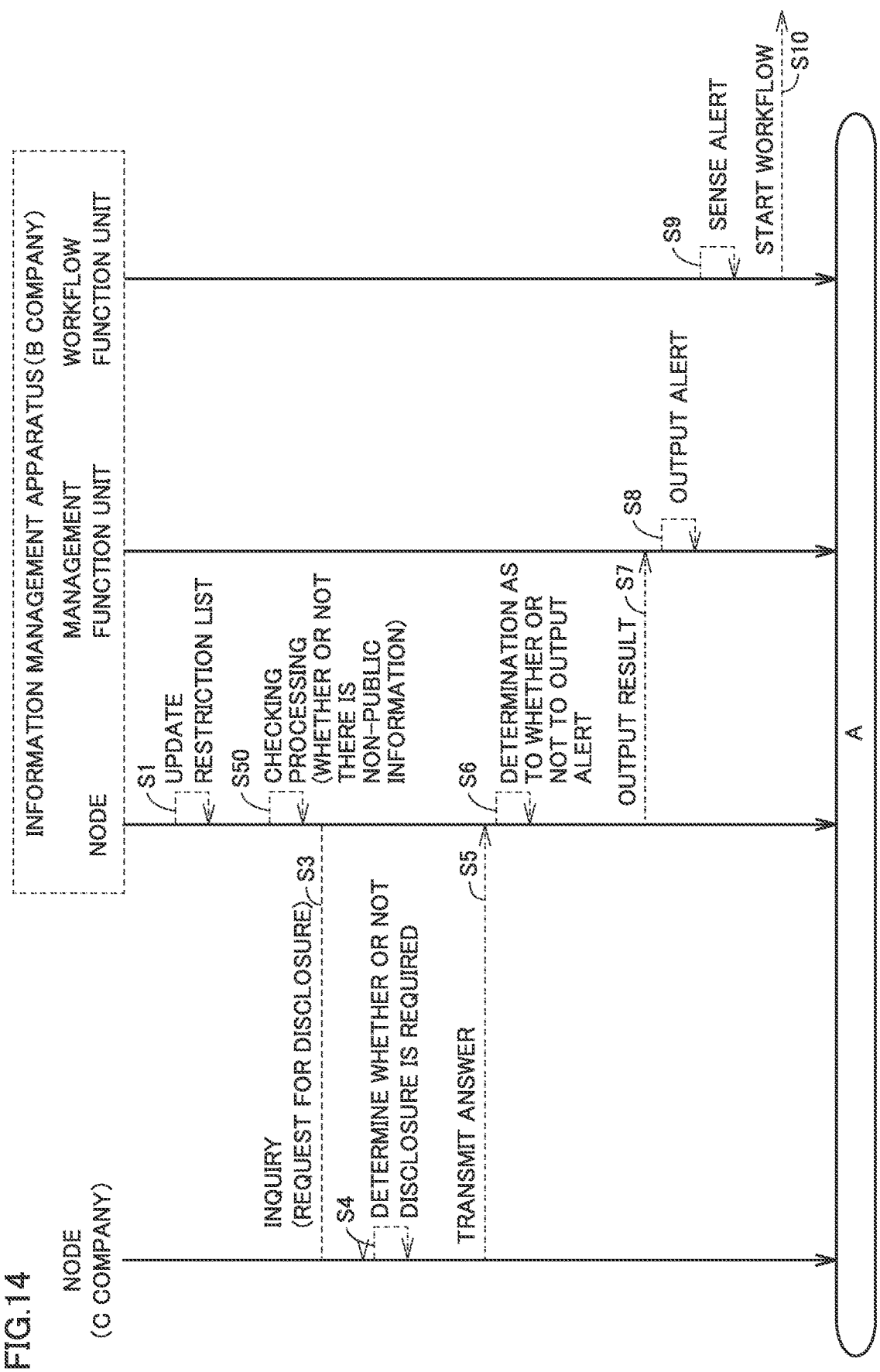
FIG. 14 is a sequence diagram for illustrating checking processing according to a first modification.

FIG. 14 is a sequence diagram for illustrating checking processing according to the first modification. The sequence diagram shown in FIG. 14 includes S50 in place of S2 in the sequence diagram in FIG. 11. Since processing other than processing in S50 is the same as the processing in the sequence diagram in FIG. 11, the processing has the same step number allotted and description thereof will not be repeated.

When restriction list 165-2 is updated in 51, in S50, node 111-2 of information management apparatus 10-2 starts the checking processing according to the first modification. Node 111-2 refers to product composition data 164-2 and determines whether or not node 111-3 of information management apparatus 10-3 discloses information indicating presence of non-public information thereof. When node 111-3 does not disclose the information indicating presence of non-public information, node 111-2 quits the process. When node 111-3 discloses the information indicating presence of non-public information, node 111-2 estimates that there is possibility that the C product contains the new restricted substance. In S3, node 111-2 generates transaction data that asks whether or not the C product contains the new restricted substance and transmits the transaction data to node 111-3 of information management apparatus 10-3.

Node 111-2 similarly refers to product composition data 164-2 and determines whether or not node 111-4 of information management apparatus 10-4 discloses information indicating presence of non-public information thereof. Node 111-2 performs processing similar to the above-described processing for node 111-3 based on this result of determination.

As set forth above, in information management system 1 according to the first modification, information indicating whether or not there is non-public information of the upstream company is disclosed in advance to the downstream company by the upstream company. Information management apparatus 10-N of the downstream company can estimate whether or not the product supplied by the upstream company contains the new restricted substance based on the information indicating whether or not there is non-public information of the upstream company. When the information management apparatus estimates that the product supplied by the upstream company does not contain the new restricted substance, the request for disclosure (inquiry) directed to the upstream company is not issued. Therefore, unnecessary information processing in information management system 1 according to the embodiment can be reduced.

[Second Modification]

In the first modification, whether or not the product supplied by the upstream company contains the new restricted substance is estimated based on the information indicating whether or not there is non-public information disclosed by the upstream company. Whether or not the product supplied by the upstream company contains the new restricted substance may be estimated, for example, based on the content ratio s included in product composition data 164-N.

Node 111-N of information management apparatus 10-N refers to product composition data 164-N and calculates the total of the content ratios of constituent products associated with constituent product numbers for each product supplied by the upstream company and included in the product of a company to which it belongs. For example, with reference to FIG. 7 by way of example, node 111-2 of information management apparatus 10-2 adds the content ratio X1% of constituent product number CA001 and the content ratio X2% of constituent product number CA002 to calculate a total Xsum of the content ratios of the C product. Node 111-2 of information management apparatus 10-2 adds the content ratio Y1% of constituent product number DA001, the content ratio Y2% of constituent product number DA002, and the content ratio X3% of constituent product number DA003 to calculate a total Ysum of the content ratios of the D product. When total Xsum is lower than 100%, node 111-2 determines that there is non-public information about the C product, and estimates that there is possibility that the B product including the C product contains the new restricted substance. Similarly, when total Ysum is lower than 100%, node 111-2 determines that there is non-public information on the D product, and estimates that there is possibility that the B product including the D product contains the new restricted substance.

Figure 15:
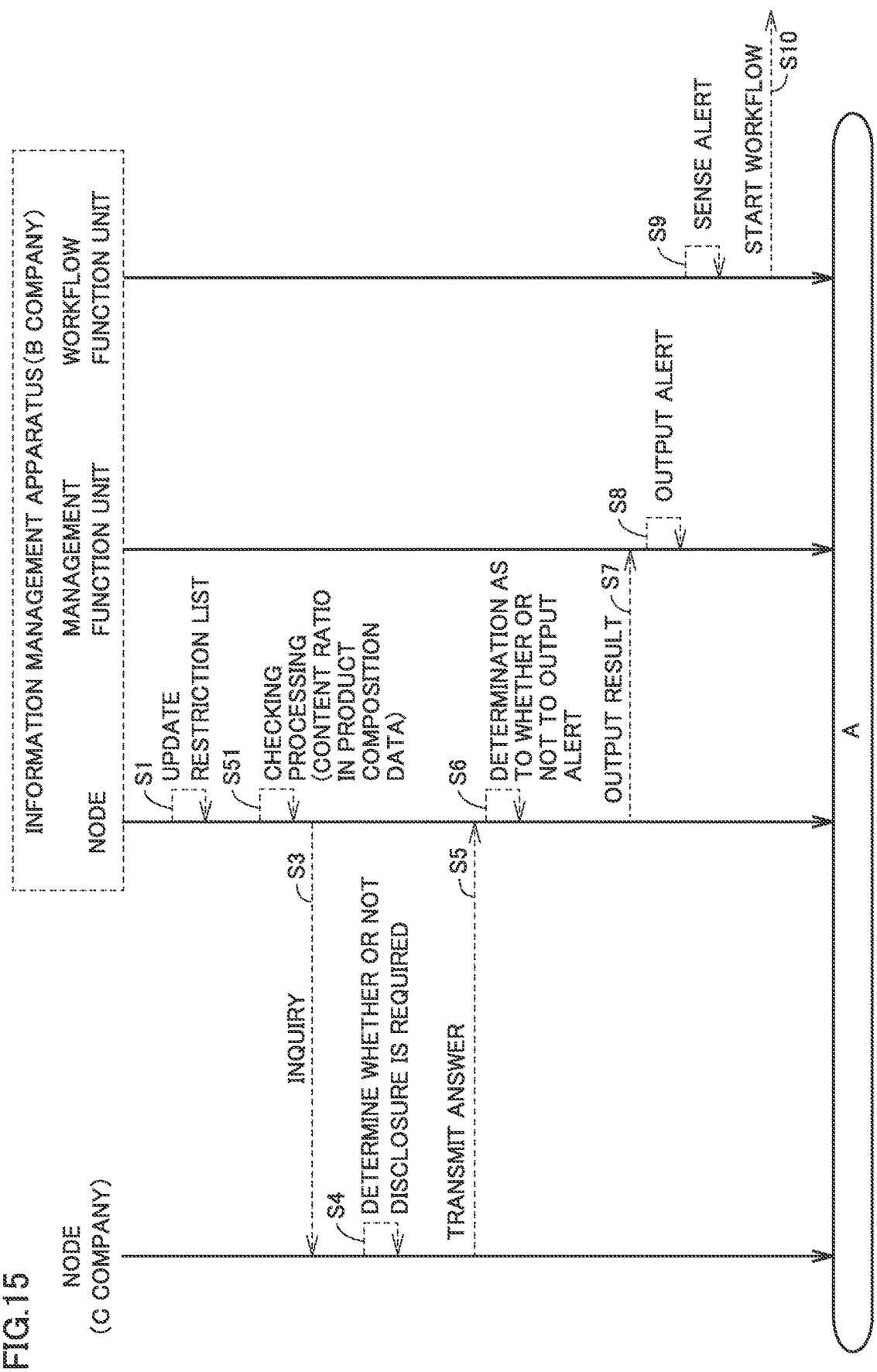
FIG. 15 is a sequence diagram for illustrating checking processing according to a second modification.

FIG. 15 is a sequence diagram for illustrating checking processing according to a second modification. The sequence diagram shown in FIG. 15 includes S51 in place of S50 in the sequence diagram in FIG. 14. Since processing other than processing in S51 is the same as the processing in the sequence diagram in FIG. 14, the processing has the same step number allotted and description thereof will not be repeated.

When restriction list 165-2 is updated in 51, in S51, node 111-2 of information management apparatus 10-2 starts the checking processing according to the second modification. Node 111-2 refers to product composition data 164-2, calculates total Xsum of the content ratios of the C product, and determines whether or not total Xsum is 100%. When total Xsum is lower than 100%, node 111-2 estimates that there is possibility that the B product contains the new restricted substance. Similarly, node 111-2 refers to product composition data 164-2, calculates total Ysum of the content ratios of the D product, and determines whether or not total Ysum is 100%. When total Ysum is lower than 100%, node 111-2 estimates that there is possibility that the B product contains the new restricted substance. When total Xsum and total Ysum are each 100%, node 111-2 estimates that there is no possibility that the B product contains the new restricted substance.

As set forth above, information management system 1 according to the second modification can also achieve an effect the same as the effect achieved by information management system 1 according to the first modification.

[Third Modification]

In the embodiments and the first and second modifications, when platform provider 30 transmits transaction data that proposes addition of the new restricted substance to restriction list 165-N, the downstream company (for example, the B company) issues a request for disclosure to the upstream company (for example, the C company). When platform provider 30 transmits the transaction data that proposes addition of the new restricted substance to restriction list 165-N, however, the upstream company may voluntarily start processing for disclosing information on the new chemical substance.

Figure 16:
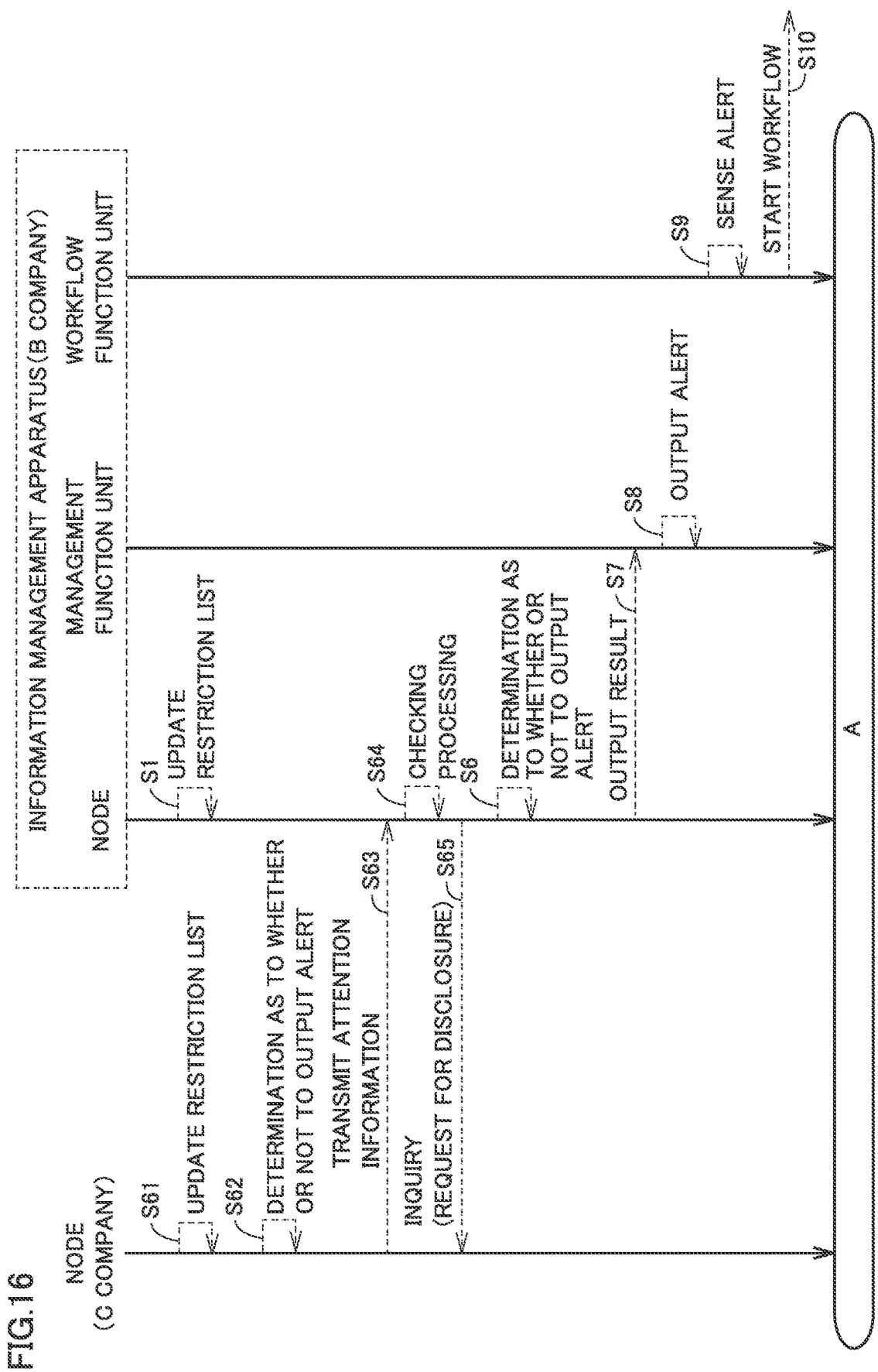
FIG. 16 is a sequence diagram for illustrating checking processing according to a third modification.

FIG. 16 is a sequence diagram for illustrating checking processing according to a third modification. The sequence diagram shown in FIG. 16 does not include processing from S2 to S5 but additionally includes processing from S61 to S65 as compared with the sequence diagram in FIG. 11. Since processing is otherwise the same as the processing in the sequence diagram in FIG. 11, the processing has the same step number allotted and description thereof will not be repeated. Though FIG. 16 does not show node 111-4, node 111-4 also performs processing similar to processing performed by node 111-3.

In 51, node 111-2 of information management apparatus 10-2 approves transaction data received from node 41 of platform provider 30 and updates restriction list 165-2. As node 111-2 updates restriction list 165-2, it stands by until a predetermined defined time elapses before it performs checking processing in S64 that follows.

In S61, node 111-3 of information management apparatus 10-3 approves transaction data received from node 41 of platform provider 30 and updates restriction list 165-3.

In S62, node 111-3 determines whether or not it has to output the alert. This processing is basically similar to processing in S6. Since there is no company upstream from node 111-3, node 111-3 refers to product composition data 164-3 and determines whether or not the C product contains the new restricted substance. When the C product contains the new restricted substance, node 111-3 determines that it has to output the alert. When the C product does not contain the new restricted substance, node 111-3 determines that it does not have to output the alert. When the node determines that it has to output the alert, information management apparatus 10-3 starts the workflow.

In S63, node 111-3 generates attention information based on a result in S62 and transmits transaction data including the attention information to node 111-2. When node 111-3 determines in S62 that it has to output the alert, it generates the attention information including information (attention-in-progress information) indicating that an action for disclosure of information on the new restricted substance has been started. When node 111-3 determines in S62 that it does not have to output the alert, it generates the attention information including information (no-need-for-attention information) indicating that there is no disclosure of information necessitated by addition of the new restricted substance to restriction list 165-3. The information (attention-in-progress information) indicating that the action for disclosure of information on the new restricted substance has been started corresponds to exemplary "information indicating presence of information to be disclosed" according to the present disclosure.

In S64, as the defined time has elapsed since S1 was performed, node 111-2 performs checking processing. Specifically, node 111-2 determines whether or not it has received the attention information from nodes 111-3 and 111-4. When node 111-2 receives the attention information from both of nodes 111-3 and 111-4, the process proceeds to S6. When node 111-2 does not receive the attention information from at least one of nodes 111-3 and 111-4, in S65, it transmits a request for disclosure to the node from which it has not received the attention information.

When node 111-2 has received the attention-in-progress information, in S6, node 111-2 determines that it has to output the alert. When node 111-2 has received the no-need-for-attention information, node 111-2 determines that it does not have to output the alert.

As set forth above, since processing performed from addition of a new restricted substance to restriction list 165-N at least until output of the alert can be automated also in information management system 1 according to the third modification, human works by a person in charge for each type of processing for an inquiry or checking can be reduced.

[Fourth Modification]

An upstream company may hash information on a chemical substance that it desires to keep secret from a downstream company with the use of a hash function and may publish a value thereof. A value hashed with the hash function is also referred to as a "hash value" below.

Node 111-N of information management apparatus 10-N incorporates into public data 166-N as composition data, a hash value of the information on the chemical substance, for which the item information expressing necessity for keeping secret has been designated as being non-public. For example, referring again to FIG. 6, node 111-3 of information management apparatus 10-3 has set information on the chemical substances identified by constituent product numbers CA003 and CA004 to non-public. Node 111-3 hashes constituent product numbers CA003 and CA004 and the content ratios thereof and incorporates hash values thereof into public data 166-3.

FIG. 17 is a diagram schematically showing exemplary product composition data 151-2 and 164-2 on the B product according to a fourth modification. A hash value of constituent product number CA003 is denoted as HA001, a hash value of constituent product number CA004 is denoted as HA002, a hash value of the content ratio X3% is denoted as HAxx1, and a hash value of the content ratio X4% is denoted as HAxx2.

Though node 111-2 of information management apparatus 10-2 does not know detailed composition of the chemical substance, the constituent product number of which is expressed with the hash value, it can recognize that the C product contains some secret chemical substance.

FIG. 18 is a sequence diagram for illustrating checking processing according to the fourth modification. The sequence diagram shown in FIG. 18 includes S70 in place of S2 in the sequence diagram in FIG. 11. Since processing other than processing in S70 is the same as the processing in the sequence diagram in FIG. 11, the processing has the same step number allotted and description thereof will not be repeated.

When restriction list 165-2 is updated in 51, in S70, node 111-2 of information management apparatus 10-2 starts checking processing according to the fourth modification. Node 111-2 refers to product composition data 164-2 and determines whether or not there is an element for which a hash value is published in the composition data. For example, when there is an element for which the hash value is published in the product composition data on the C product, node 111-2 estimates that there is possibility that the C product contains the new restricted substance. In S3, node 111-2 then generates transaction data that asks whether or not the C product contains the new restricted substance and transmits the transaction data to node 111-3 of information management apparatus 10-3. When there is no element for which the hash value is published in the product composition data on the C product and the D product, node 111-2 estimates that there is no possibility that the B product contains the new restricted substance.

In generation of the hash value, a plurality of pieces of data may collectively be hashed with the hash function, rather than a single piece of data. For example, a value (a hash value HA111) resulting from collective hashing of constituent product number CA003 and time and date of creation of data may be generated, and this value may be used instead of hash value HA001. Alternatively, for example, a value (a hash value HA222) resulting from collective hashing of the content ratio X3% and time and date of creation of data may be generated, and this value may be used instead of hash value HAxx1. Collective hashing of a plurality of pieces of data can be higher in security than hashing of a single piece of data. In particular, hashing, with data that only the C company can know being incorporated, such as time and date of creation of data, can further improve security.

As set forth above, information management system 1 according to the fourth modification can also achieve an effect the same as the effect achieved by information management system 1 according to the first modification.

In checking processing in S70 described above, node 111-2 refers to product composition data 164-2, and when there is an element for which a hash value is published in the composition data, node 111-2 may further obtain a hash value (which is also referred to as a "subject hash value" below) generated by hashing of information on the new restricted substance added in S1 from the node of the upstream company, and may check the subject hash value against product composition data 164-2. For example, as shown in FIG. 17, an example where the composition data on the C product includes a hash value is assumed. Node 111-2 further obtains the subject hash value from node 111-3 of the C company and checks the subject hash value against product composition data 164-2. When product composition data 164-2 includes the hash value that matches with the subject hash value, node 111-2 estimates that there is possibility that the C product contains the new restricted substance. Node 111-2 thus may estimate that the C product contains the new restricted substance and may transmit the request for disclosure to node 111-3 in S3.

At the time of update of restriction list 165-3 of the C company, the subject hash value may be transmitted from node 111-3 to node 111-2 voluntarily or in response to a request from node 111-2. When restriction list 165-2 is updated, node 111-2 may refer to product composition data 164-2, and when there is an element for which a hash value is published in composition data, node 111-2 may request node 111-3 to transmit the hash value (subject hash value) in connection with the new restricted substance.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. An information management system that manages information on a chemical substance contained in a product distributed in a supply chain based on distributed ledger technology, the information management system comprising:
a first apparatus that belongs to a first company, the first company is a manufacturer of a first product, the first apparatus comprising (i) a first controller including a first processor and (ii) a first storage in which is stored a first distributed ledger;
a second apparatus that belongs to a second company, the second company is a supplier of a second product to be included in the first product to the first company, the second apparatus comprising (a) a second controller including a second processor and (b) a second storage in which is stored a second distributed ledger; and
a management apparatus that manages the information management system, the management apparatus comprising (1) a third controller including a third processor and (2) a third storage in which is stored a third distributed ledger, wherein
each of the first distributed ledger, the second distributed ledger, and the third distributed ledger includes a restriction list showing the chemical substance managed by the information management system,
the first distributed ledger stored in the first storage of the first apparatus stores, in addition to the restriction list, composition data of the first product including public data which is composition data of the second product disclosed to the first processor of the first apparatus by the second processor of the second apparatus,
the second distributed ledger stored in the second storage of the second apparatus stores, in addition to the restriction list, the public data which includes information on a chemical substance included in both of the composition data of the second product and the restriction list,
the third processor of the management apparatus is configured to
add, when the third processor designates a new chemical substance to be managed by the information management system, the new chemical substance to the restriction list stored in the third distributed ledger to update the restriction list in the third distributed ledger, and
transmit first transaction data that proposes addition of the new chemical substance to update the restriction list in the first distributed ledger and the restriction list in the second distributed ledger to the first processor of the first apparatus and to the second processor of the second apparatus,
the first processor of the first apparatus and the second processor of the second apparatus respectively update the restriction list in the first distributed ledger and the restriction list in the second distributed ledger based on the first transaction data transmitted from the third processor,
the first processor of the first apparatus is configured to determine, in response to the update of the restriction list in the first distributed ledger, whether or not there is a possibility that the new chemical substance is contained in the second product,
when the first processor of the first apparatus has determined that there is the possibility that the new chemical substance is contained in the second product, the first processor of the first apparatus is configured to transmit second transaction data including a request for disclosure of whether the new chemical substance is contained in the second product to the second apparatus,
the second distributed ledger stored in the second storage of the second apparatus includes (A) a public area in which the restriction list and the public data are stored, and (B) a secret area in which the composition data of the second product is stored, and
the second processor of the second apparatus, in response to receipt of the second transaction data from the first processor, automatically extracts information as to whether the new chemical substance is contained in the second product by on-chain accessing the product composition data of the second product stored in the secret area of the second distributed ledger and, when the new chemical substance is contained in the second product, adds the new chemical substance to the public data stored in the public area of the second distributed ledger.

2. The information management system according to claim 1, wherein
in response to the second transaction data including the request for disclosure, the second apparatus
transmits, when the new chemical substance is not contained in the second product, third transaction data including information indicating that the new chemical substance is not contained in the second product to the first apparatus, and
transmits to the first apparatus, when the new chemical substance is contained in the second product, fourth transaction data including information indicating subsequent disclosure of fifth transaction data including the public data including information on the new chemical substance.

3. The information management system according to claim 2, wherein
the second processor of the second apparatus is configured to communicate with a plurality of terminal apparatuses belonging to respective ones of a plurality of departments associated with the second company,
the second processor of the second apparatus obtains approval for disclosure of the information on the new chemical substance from a terminal apparatus belonging to a department having an authority to disclose the information on the new chemical substance, of the plurality of terminal apparatuses, and
the second processor of the second apparatus transmits the fifth transaction data including the public data including the information on the new chemical substance to the first apparatus.

4. The information management system according to claim 1, wherein
the first processor of the first apparatus estimates that there is the possibility that the new chemical substance is contained in the second product when the public data does not include the information on the new chemical substance.

5. The information management system according to claim 1, wherein
when there is composition data of the second product not included in the public data, the second processor of the second apparatus transmits to the first apparatus, sixth transaction data including the public data and information indicating presence of non-public information, and the first processor of the first apparatus estimates that there is the possibility that the new chemical substance is contained in the second product when the first processor has received the sixth transaction data including the information indicating presence of the non-public information from the second apparatus.

6. The information management system according to claim 1, wherein the public data includes information on content ratios for components of the second product, and the first processor of the first apparatus estimates that there is the possibility that the new chemical substance is contained in the second product when a total of the content ratios included in the public data is less than 100%.

7. The information management system according to claim 1, wherein when the second product contains the new chemical substance added to the restriction list in the second distributed ledger and when the information on the new chemical substance is not included in the public data, the second processor of the second apparatus transmits to the first apparatus, seventh transaction data including the information indicating presence of information to be disclosed, and when the first processor of the first apparatus has received from the second apparatus, the information indicating presence of the information to be disclosed, the first processor estimates that there is the possibility that the new chemical substance is contained in the second product.

8. An information management method for an information management system that manages information on a chemical substance contained in a product distributed in a supply chain based on distributed ledger technology, the information management system including a first apparatus that belongs to a first company, the first company is a manufacturer of a first product, the first apparatus comprising (i) a first controller including a first processor and (ii) a first storage in which is stored a first distributed ledger, a second apparatus that belongs to a second company, the second company is a supplier of a second product to be included in the first product to the first company, the second apparatus comprising (a) a second controller including a second processor and (b) a second storage in which is stored a second distributed ledger, and a management apparatus that manages the information management system, the management apparatus comprising (1) a third controller including a third processor and (2) a third storage in which is stored a third distributed ledger, each of the first distributed ledger, the second distributed ledger, and the third distributed ledger including a restriction list showing the chemical substance managed by the information management system, the first distributed ledger stored in the first storage of the first apparatus stores, in addition to the restriction list, composition data of the first product including public data which is composition data of the second product disclosed to the first processor of the first apparatus by the second apparatus, the second distributed ledger stored in the second storage of the second apparatus stores, in addition to the restriction list, the public data which includes information on a chemical substance included in both of the composition data of the second product and the restriction list, the information management method comprising:

adding, by the third processor of the management apparatus, when the third processor designates a new chemical substance to be managed by the information management system, the new chemical substance to the restriction list stored in the third distributed ledger to update the restriction list in the third distributed ledger;

transmitting, by the third processor, first transaction data that proposes addition of the new chemical substance to update the restriction list in the first distributed ledger and the restriction list in the second distributed ledger to the first processor of the first apparatus and to the second processor of the second apparatus;

updating, by the first processor of the first apparatus and the second processor of the second apparatus, the restriction list in the first distributed ledger and the restriction list in the second distributed ledger based on the first transaction data transmitted from the third processor;

determining, by the first processor of the first apparatus, in response to the update of the restriction list in the first distributed ledger, whether or not there is a possibility that the new chemical substance is contained in the second product; and transmitting, by the first processor of the first apparatus, when the first apparatus has determined that there is the possibility that the new chemical substance is contained in the second product, second transaction data including a request for disclosure of whether the new chemical substance is contained in the second product to the second apparatus; wherein the second distributed ledger stored in the second storage of the second apparatus includes (A) a public area in which the restriction list and the public data are stored, and (B) a secret area in which the composition data of the second product is stored, and further comprising automatically extracting, by the second processor of the second apparatus, in response to receipt of the second transaction data from the first processor, information as to whether the new chemical substance is contained in the second product by on-chain accessing the product composition data of the second product stored in the secret area of the second distributed ledger and, when the new chemical substance is contained in the second product, adding the new chemical substance to the public data stored in the public area of the second distributed ledger.

\* \* \* \* \*